United States Patent
Yoshimura et al.

(10) Patent No.: US 11,117,252 B2
(45) Date of Patent: Sep. 14, 2021

(54) ROBOT

(71) Applicant: Seiko Epson Corporation, Tokyo (JP)

(72) Inventors: Kazuto Yoshimura, Matsumoto (JP); Sho Nakano, Matsumoto (JP)

(73) Assignee: Seiko Epson Corporation

(*) Notice: Subject to any disclaimer, the term of this patent is extended or adjusted under 35 U.S.C. 154(b) by 116 days.

(21) Appl. No.: 16/286,135

(22) Filed: Feb. 26, 2019

(65) Prior Publication Data

US 2019/0262985 A1  Aug. 29, 2019

(30) Foreign Application Priority Data

Feb. 28, 2018 (JP) .............................. JP2018-036006
Apr. 26, 2018 (JP) .............................. JP2018-084832

(51) Int. Cl.
| B25J 18/06 | (2006.01) |
| B25J 9/16 | (2006.01) |
| B25J 19/00 | (2006.01) |
| B25J 9/00 | (2006.01) |

(52) U.S. Cl.
CPC .......... B25J 9/0018 (2013.01); B25J 9/1612 (2013.01); B25J 18/06 (2013.01); B25J 19/0029 (2013.01); B25J 19/0058 (2013.01); B25J 19/0079 (2013.01)

(58) Field of Classification Search
CPC ............... B25J 19/0079; B25J 19/0058; B25J 19/0029; B25J 15/0616; B25J 15/0023; B25J 15/0095
See application file for complete search history.

(56) References Cited

U.S. PATENT DOCUMENTS

| 6,267,022 | B1 * | 7/2001 | Suzuki | ................. | B25J 19/0075 |
| | | | | | 74/490.01 |
| 8,286,527 | B2 * | 10/2012 | Liu | ...................... | B25J 19/0079 |
| | | | | | 74/490.02 |
| 2010/0313694 | A1 | 12/2010 | Aoki | | |
| 2018/0236671 | A1 | 8/2018 | Yoshimura et al. | | |
| 2019/0099901 | A1 * | 4/2019 | Niu | ...................... | B25J 19/0075 |

FOREIGN PATENT DOCUMENTS

| JP | 2010-284777 A | | 12/2010 | | |
| JP | 2018-134697 A | | 8/2018 | | |
| JP | 2018134697 A | * | 8/2018 | .......... | B25J 19/0029 |
| WO | WO-2016009785 A1 | * | 1/2016 | .......... | B25J 19/0054 |

* cited by examiner

*Primary Examiner* — Patrick Cicchino

(74) *Attorney, Agent, or Firm* — Harness, Dickey & Pierce, P.L.C.

(57) ABSTRACT

A robot includes a base, a robot arm having a first arm provided on the base and configured to rotate about a first rotation axis and a second arm provided on the first arm and configured to rotate about a second rotation axis, a cable placed inside of the robot arm, and a tube having a suction hole for suctioning a gas inside of the robot arm when connected to a pump, wherein a first gap is provided between the first arm and the second arm, and the suction hole is placed inside of the robot arm.

12 Claims, 14 Drawing Sheets

ROBOT

BACKGROUND

1. Technical Field

The present invention relates to a robot.

2. Related Art

Robots each including a base and a robot arm having a plurality of arms (links) are known. One arm of the adjacent two arms of the robot arm is rotatably coupled to the other arm via a joint part, and the arm on the most proximal end side (on the most upstream side) is rotatably coupled to the base via a joint part. The joint parts are driven by motors and the arms rotate by driving of the joint parts. Further, as an end effector, e.g. a hand is detachably attached to the arm on the most distal end side (on the most downstream side). For example, the robot grasps an object with the hand, moves the object to a predetermined location, and performs predetermined work such as assembly.

As the robot, Patent Document 1 (JP-A-2010-284777) discloses a vertical articulated robot including a base and a robot arm having a plurality of arms, in which a cable is placed in a U-shape in a joint part. In the robot, the cable is respectively fixed to an upper bottom portion (rotating portion) and a lower bottom portion (fixed portion) in the joint part and the cable is placed in the U-shape between an upper bottom-side guide portion in an annular shape fixed to the upper bottom portion and a lower bottom-side guide portion in an annular shape fixed to the lower bottom portion, and thereby, the movable range of the joint of the robot is secured. Further, the upper bottom-side guide portion has a gap (space) between the upper bottom-side guide portion and the lower bottom-side guide portion for relative rotation to the lower bottom-side guide portion. Generally, grease is applied to the cable for reducing friction resistance.

However, in the robot disclosed in Patent Document 1, there is the gap between the upper bottom-side guide portion (cover) and the lower bottom-side guide portion (cover) and, when the arm rotates and the cable moves, foreign matter including grease (lubricant) and abrasion powder of the cable may come out from the gap.

SUMMARY

A robot according to an aspect of the invention includes a base, a robot arm having a first arm provided on the base rotatably about a first rotation axis and a second arm provided on the first arm rotatably about a second rotation axis, a cable placed inside of the robot arm, and a tube having a suction hole for suctioning a gas inside of the robot arm when connected to a suction device, wherein a first gap is provided between the first arm and the second arm, and the suction hole is placed inside of the robot arm.

In the robot, it is preferable that the suction hole is an opening provided in an end surface of the tube.

In the robot, it is preferable that the suction hole is an opening provided in a side surface of the tube.

In the robot, it is preferable that a plurality of the suction holes are provided.

In the robot, it is preferable that the tube is placed along the cable.

In the robot, it is preferable that a first fixing portion that fixes the cable to the first arm and a second fixing portion that fixes the cable to the second arm are provided, the cable has a portion folded back between the first fixing portion and the second fixing portion and slidable, and the suction hole is placed closer to a side of the slidable portion than the first fixing portion and the second fixing portion.

In the robot, it is preferable that a first fixing portion that fixes the cable to the first arm and a second fixing portion that fixes the cable to the second arm are provided, the cable has a portion folded back between the first fixing portion and the second fixing portion and slidable, and the suction hole is placed closer to an opposite side to the slidable portion than the first fixing portion and the second fixing portion.

In the robot, it is preferable that the robot arm has a third arm provided on the second arm rotatably about a third rotation axis and a second gap between the second arm and the third arm, and the suction hole is placed between the first gap and the second gap as seen from an axial direction of the second rotation axis.

BRIEF DESCRIPTION OF THE DRAWINGS

The invention will be described with reference to the accompanying drawings, wherein like numbers reference like elements.

DESCRIPTION OF EXEMPLARY EMBODIMENTS

As below, a robot according to the invention will be explained in detail based on embodiments shown in the accompanying drawings.

First Embodiment

Figure 1:
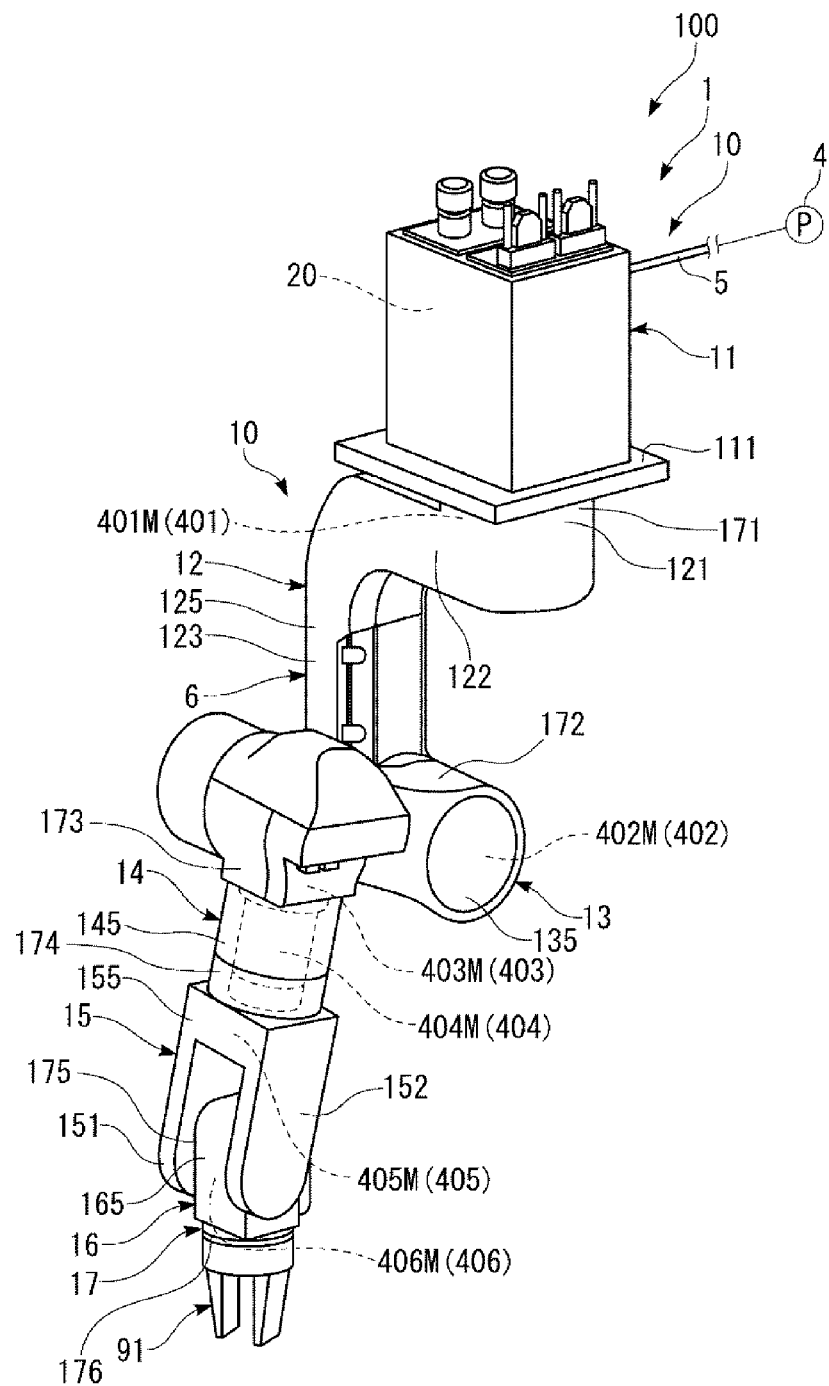
FIG. 1 is a perspective view showing a first embodiment of a robot (robot system) according to the invention.
Figure 2:
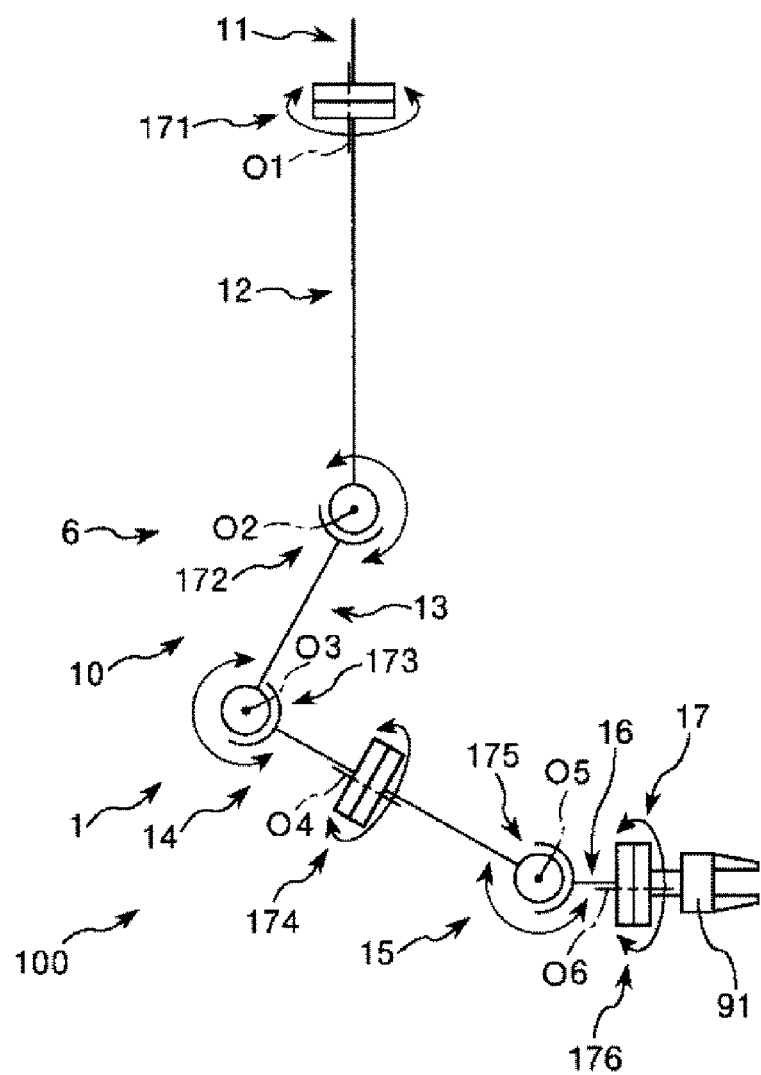
FIG. 2 is a schematic diagram of the robot shown in FIG. 1.
Figure 3:
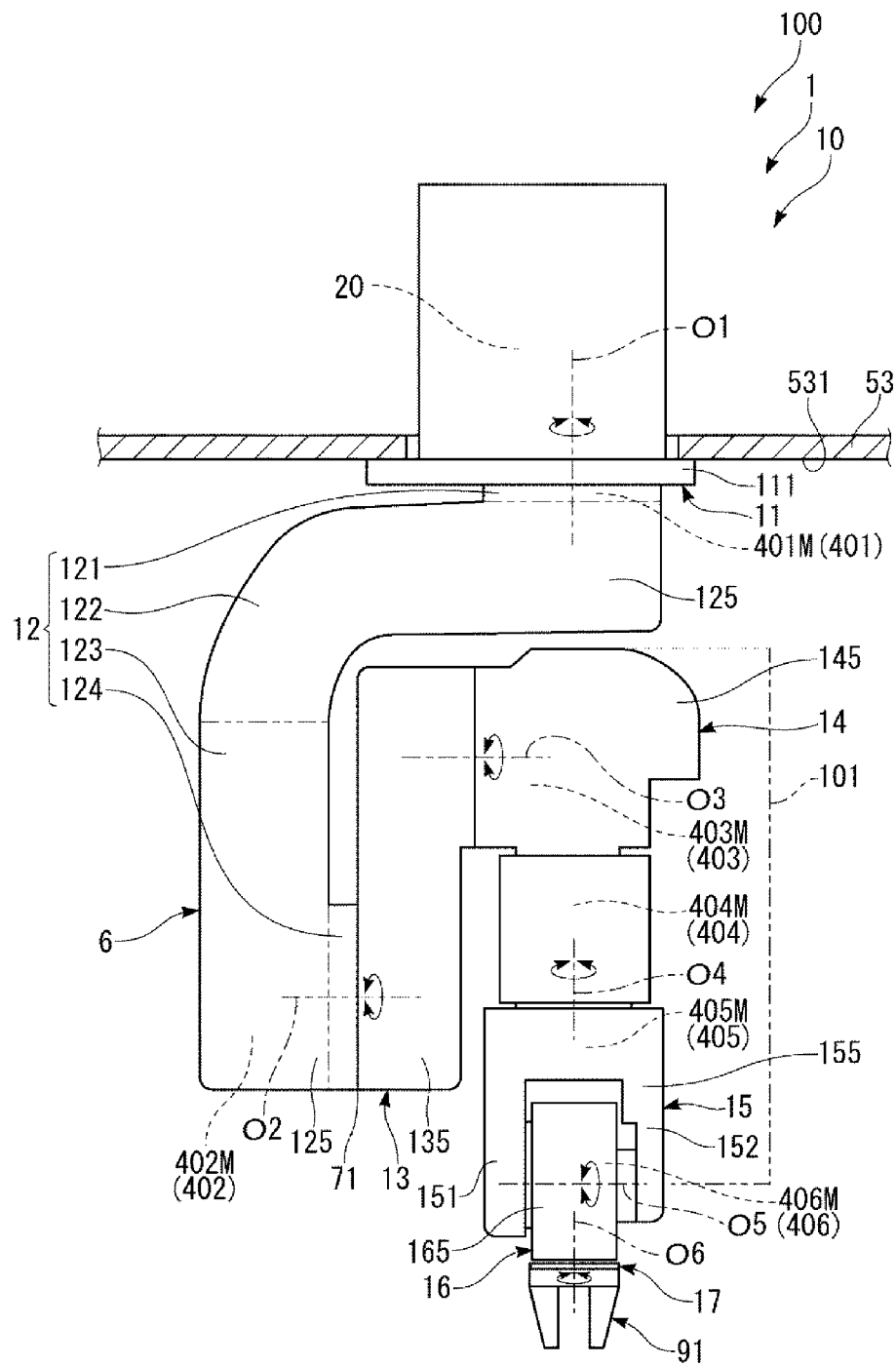
FIG. 3 is a side view of the robot shown in FIG. 1.
Figure 4:
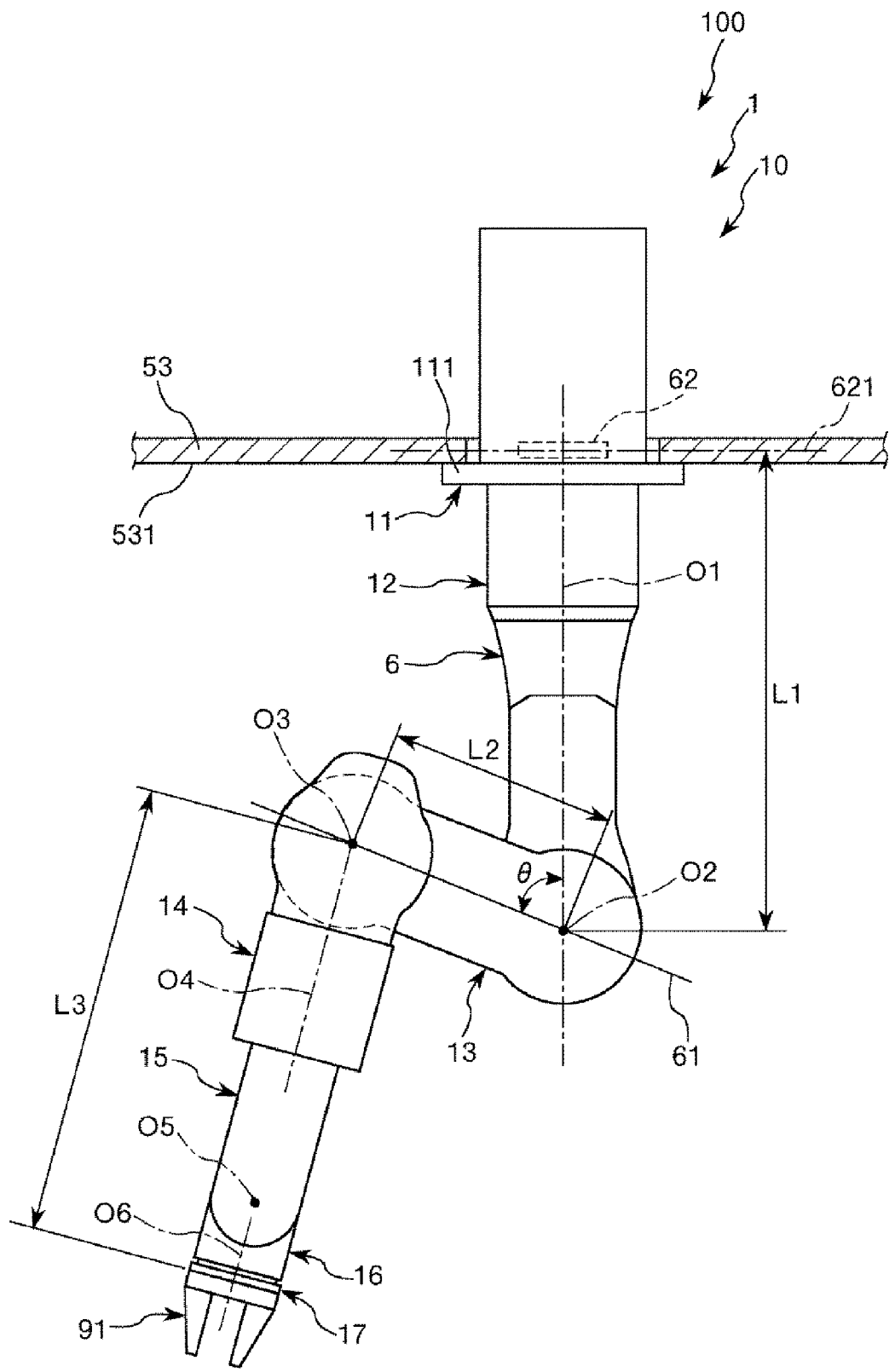
FIG. 4 is a front view of the robot shown in FIG. 1.
Figure 5:
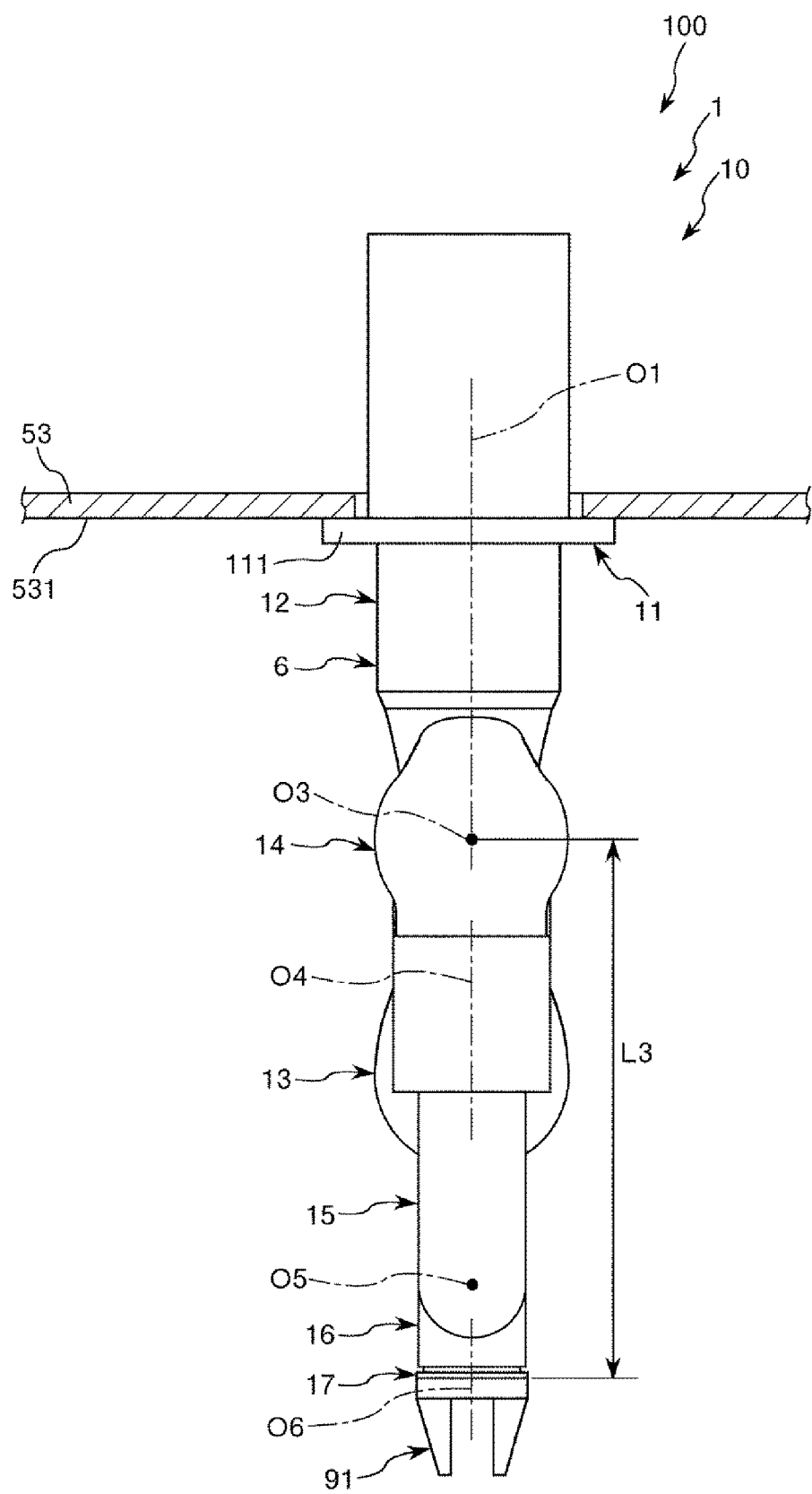
FIG. 5 is a front view of the robot shown in FIG. 1.
Figure 6:
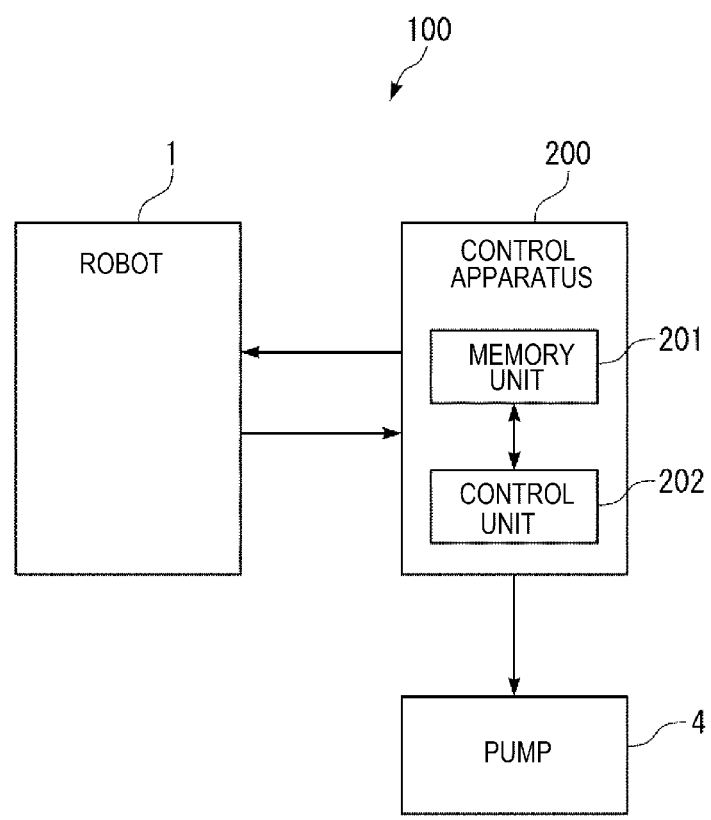
FIG. 6 is a block diagram of the robot (robot system) shown in FIG. 1.
Figure 7:
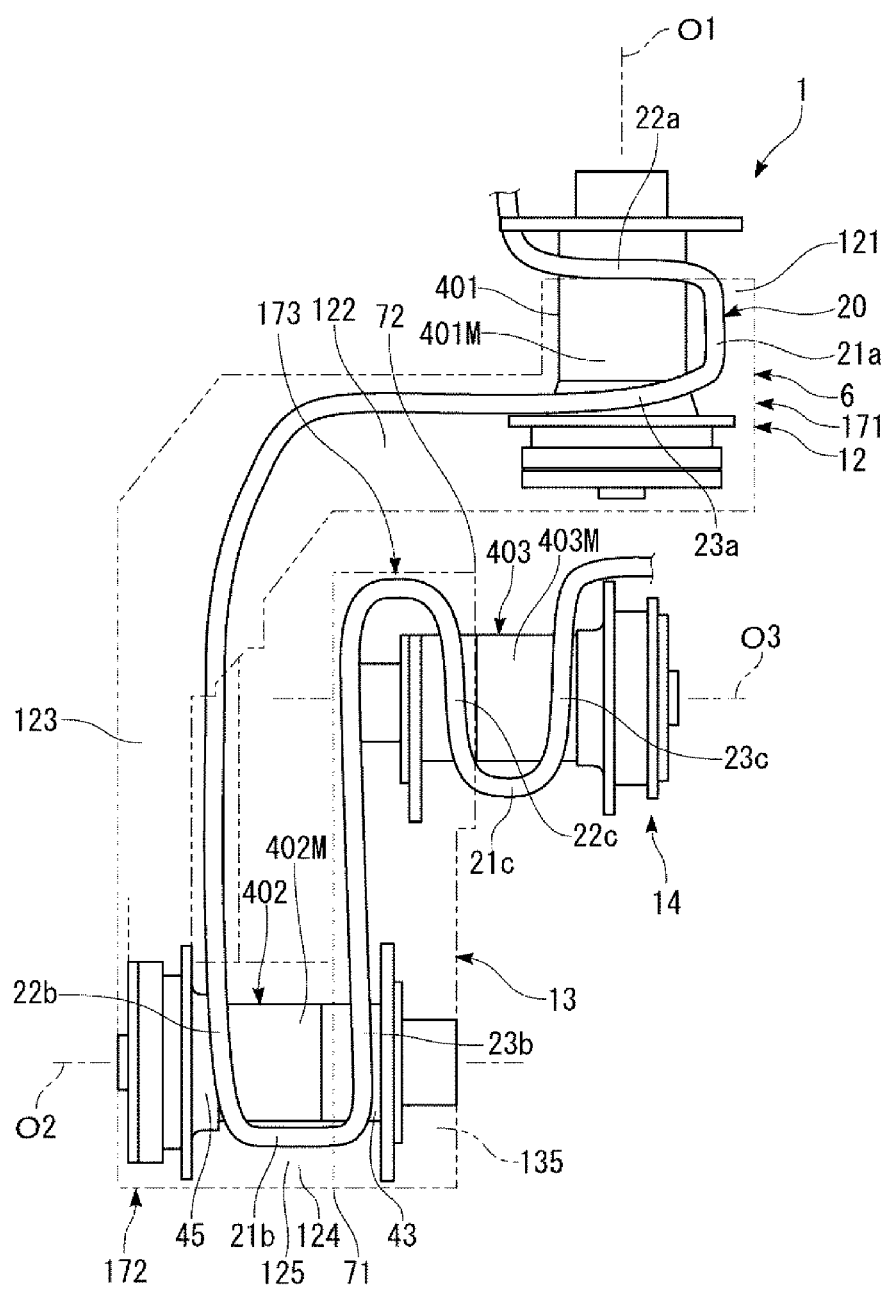
FIG. 7 is a diagram for explanation of a placement of a cable etc. of the robot shown in FIG. 1.
Figure 8:
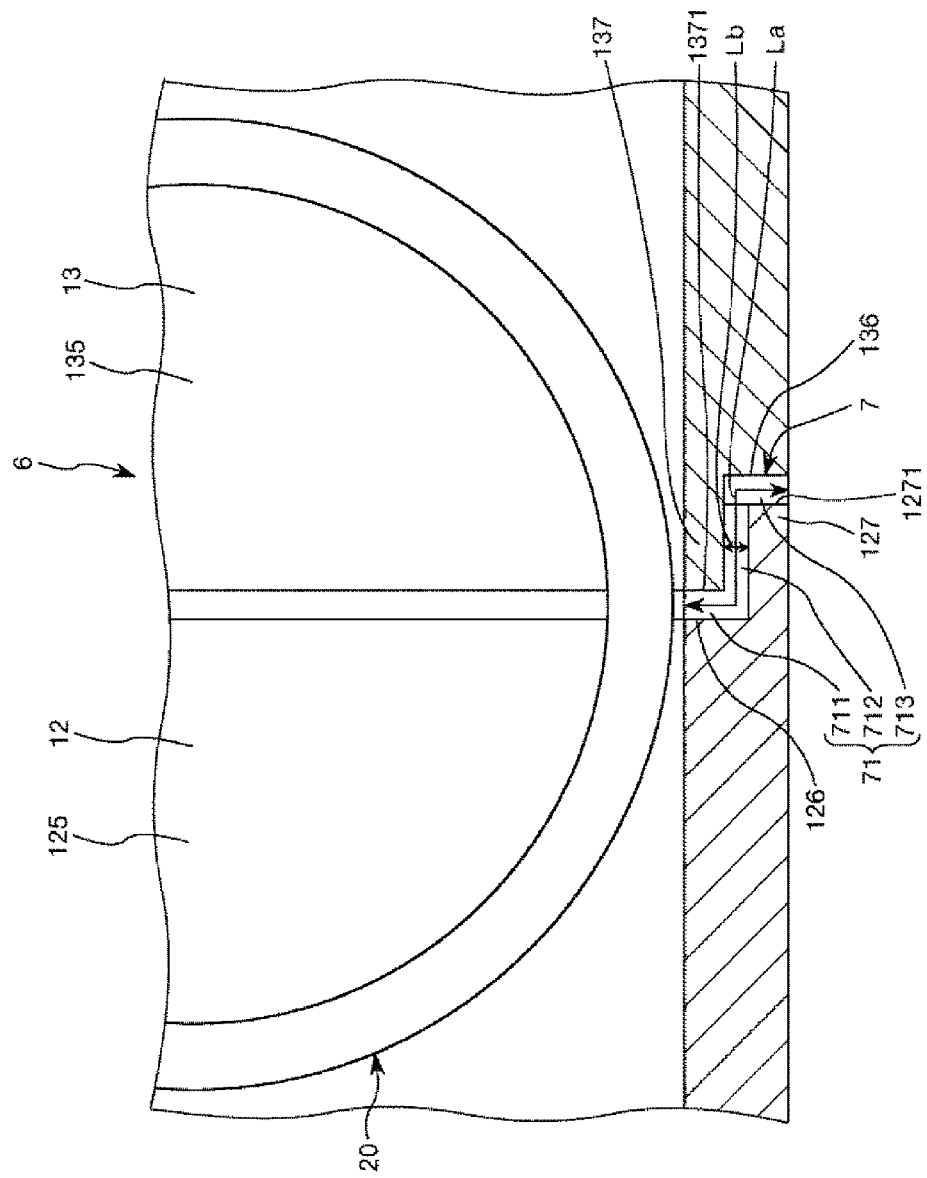
FIG. 8 is a sectional view showing a non-contact seal structure portion of the robot shown in FIG. 1.
Figure 9:
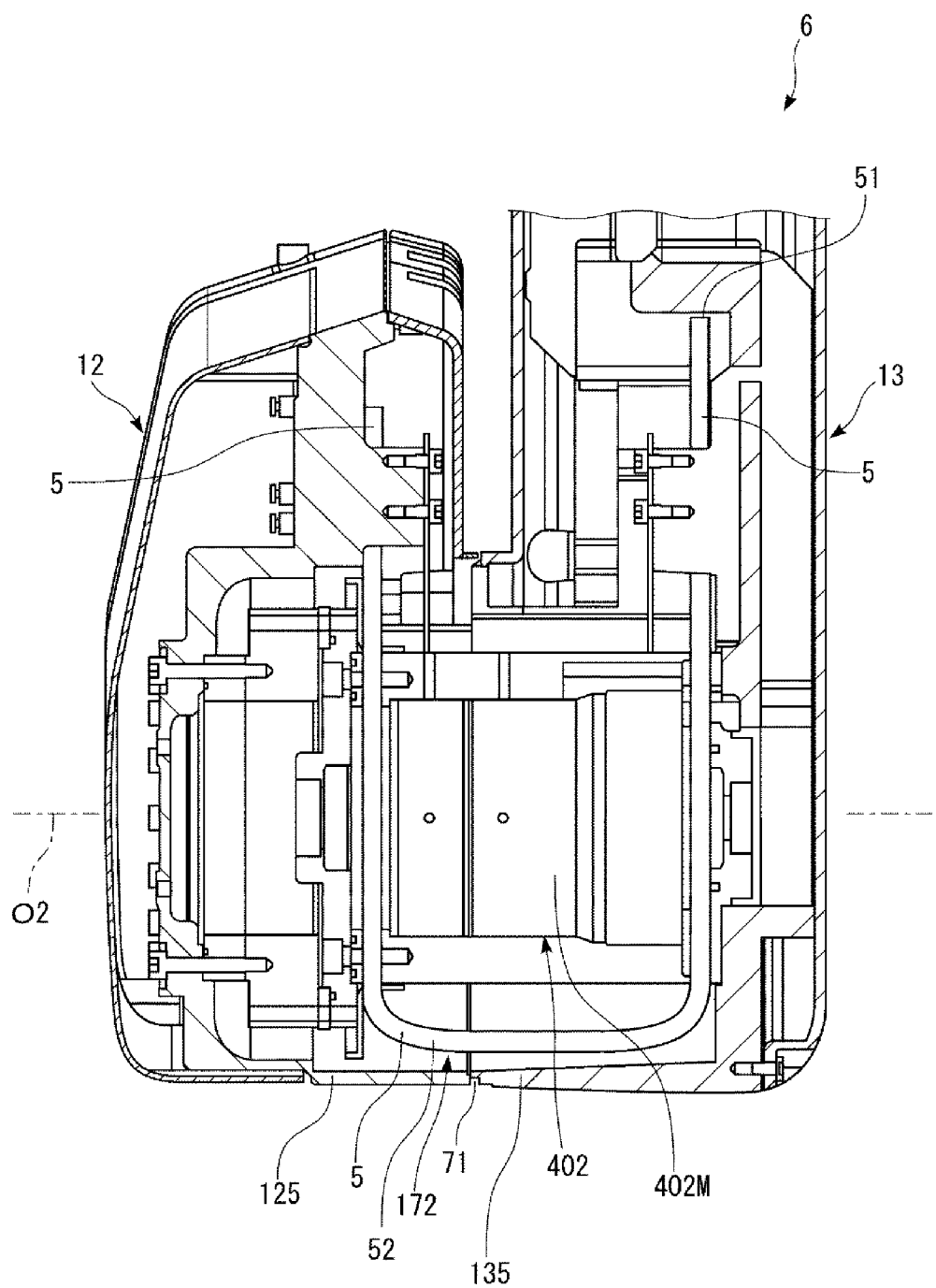
FIG. 9 is a sectional view of a first arm and a second arm of the robot shown in FIG. 1.
Figure 10:
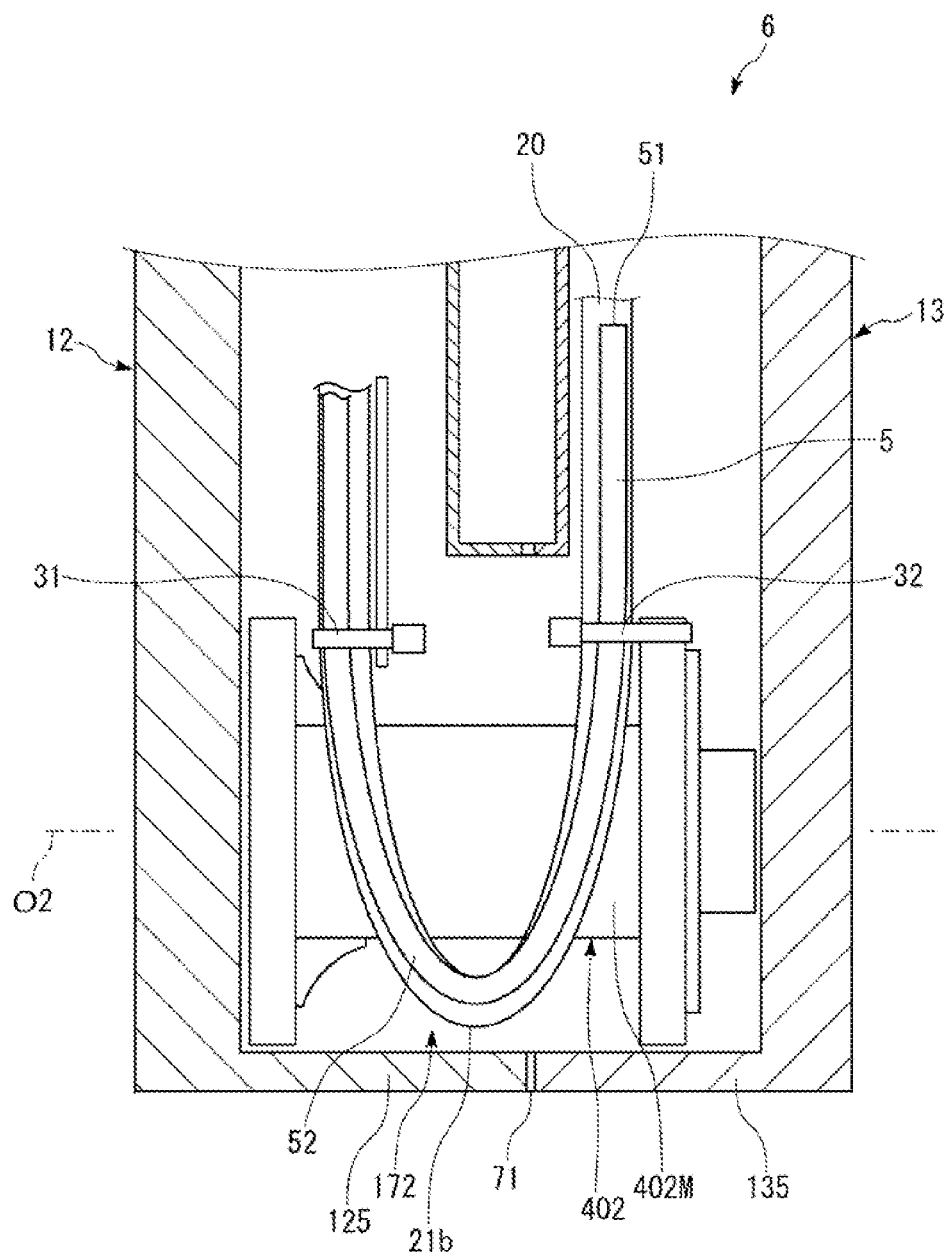
FIG. 10 is a sectional view schematically showing the configuration in FIG. 9.

FIG. 1 is a perspective view showing the first embodiment of a robot (robot system) according to the invention. FIG. 2 is a schematic diagram of the robot shown in FIG. 1. FIG. 3 is a side view of the robot shown in FIG. 1. FIG. 4 is a front view of the robot shown in FIG. 1. FIG. 5 is a front view of the robot shown in FIG. 1. FIG. 6 is a block diagram of the robot (robot system) shown in FIG. 1. FIG. 7 is a diagram for explanation of a placement of a cable etc. of the robot shown in FIG. 1. FIG. 8 is a sectional view showing a non-contact seal structure portion of the robot shown in FIG. 1. FIG. 9 is a sectional view of a first arm and a second arm of the robot shown in FIG. 1. FIG. 10 is a sectional view schematically showing the configuration in FIG. 9. In FIGS. 7 and 8, a tube is not shown. Further, in FIG. 9, the cable is not shown and the structure of the non-contact seal structure portion is simplified.

Hereinafter, for convenience of explanation, the upside in FIGS. 1 and 3 to 5 is referred to as "up" or "upper" and the downside is referred to as "low" or "lower". Further, the base side in FIGS. 1 to 5 is referred to as "proximal end" or "upstream" and the opposite side (hand side) is referred to as "distal end" or "downstream". Furthermore, upward and downward directions in FIGS. 1 and 3 to 5 are referred to as "vertical directions" and rightward and leftward directions are referred to as "horizontal directions". In the specification, "horizontal" includes not only the completely horizontal case but also the cases with inclination within ±5° relative to horizontal. Similarly, in the specification, "vertical" includes not only the completely vertical case but also the cases with inclination within ±5° relative to vertical. Further, in the specification, "parallel" includes not only the case where two lines (including axes) or surfaces are completely parallel to each other but also the cases where +50 one is inclined within relative to the other.

Furthermore, in the specification, "orthogonal" includes not only the case where two lines (including axes) or surfaces are completely orthogonal to each other but also the cases where one is inclined within ±5° relative to the other. The lateral direction in FIG. 8 is the same as the axial direction of a second rotation axis O2. Note that these apply to the drawings of the other embodiments.

As shown in FIGS. 1 to 3 and 6, a robot system 100 (industrial robot system) includes a robot 1 (industrial robot) and a control apparatus 200 (robot control apparatus) that controls the robot 1. The robot system 100 may be used in e.g. a manufacturing process for manufacturing a precision apparatus such as a wristwatch or the like. Further, the robot system 100 may perform e.g. respective work of feeding, removing, carrying, assembly, etc. of the precision apparatus or components forming the apparatus. Note that, in the invention, the robot 1 may have the control apparatus 200.

The control apparatus 200 includes a control unit 202 that performs respective control, a memory unit 201 that stores respective information, etc. The control apparatus 200 may be formed using e.g. a personal computer (PC) containing a CPU (Central Processing Unit) (not shown) etc., and controls the respective parts of a first motor 401M, a second motor 402M, a third motor 403M, a fourth motor 404M, a fifth motor 405M, a sixth motor 406M, a hand 91, etc. of the robot 1, which will be described later. Further, programs for controlling the robot 1 are stored in the memory unit 201 in advance.

A part or all of the control apparatus 200 may be provided inside of the robot (robot main body 10) or provided separately from the robot 1. In the embodiment, the control apparatus 200 is provided inside of a base 11 of the robot 1, which will be described later.

In the case where the robot 1 and the control apparatus 200 are separately formed, for example, the robot 1 and the control apparatus 200 may be electrically connected by a cable (not shown) for wired communications, or without the cable for wireless communications.

The robot 1 includes the robot main body 10, a first drive source 401, a second drive source 402, a third drive source 403, a fourth drive source 404, a fifth drive source 405, and a sixth drive source 406. The robot main body 10 includes the base (supporting unit) 11 and a robot arm 6.

The robot arm 6 includes a first arm 12 rotatably provided about a first rotation axis O1 on (connected to) the base 11, a second arm 13 rotatably provided about a second rotation axis O2 in an axial direction different from (in the embodiment, orthogonal to) an axial direction of the first rotation axis O1, a third arm 14 rotatably provided about a third rotation axis O3 on the second arm 13, a fourth arm 15 rotatably provided about a fourth rotation axis O4 on the third arm 14, a fifth arm 16 rotatably provided about a fifth rotation axis O5 on the fourth arm 15, and a sixth arm 17 rotatably provided about a sixth rotation axis O6 on the fifth arm 16. Further, the first arm 12, the second arm 13, the third arm 14, the fourth arm 15, the fifth arm 16, and the sixth arm 17 have covers 125, 135, 145, 155, 165 and the first drive source 401, the second drive source 402, the third drive source 403, the fourth drive source 404, the fifth drive source 405, the sixth drive source 406, etc. are placed inside thereof, respectively. Note that the fifth arm 16 and the sixth arm 17 form a wrist and, e.g. an end effector such as a hand 91 may be detachably attached to the distal end of the sixth arm 17 (the distal end of the robot arm 6). As below, the robot 1 will be explained in detail.

The type of the robot 1 is not particularly limited, but, in the embodiment, the robot 1 is a vertical articulated (six-axis) robot in which the base 11, the first arm 12, the second arm 13, the third arm 14, the fourth arm 15, the fifth arm 16, and the sixth arm 17 are sequentially coupled from the proximal end side toward the distal end side. "Vertical articulated robot" refers to a robot in which the number of rotation axes (the number of arms) is two or more and two rotation axes of the rotation axes of the robot cross (are orthogonal to) each other. Note that, hereinafter, the first arm 12, the second arm 13, the third arm 14, the fourth arm 15, the fifth arm 16, and the sixth arm 17 are respectively also referred to as "arm". The first drive source 401, the second drive source 402, the third drive source 403, the fourth drive source 404, the fifth drive source 405, and the sixth drive source 406 are respectively also referred to as "drive source".

As shown in FIG. 3, the base 11 is a part fixed to (supported by) (a member attached to) a predetermined part of an installation space. The fixing method is not particularly limited, but e.g. the fixing method using a plurality of bolts or the like may be employed.

In the embodiment, the base 11 is fixed to a ceiling surface 531 of a ceiling (ceiling part) 53 of the installation space. The ceiling surface 531 is a flat surface parallel to the horizontal plane. Note that a plate-like flange 111 provided in the distal end part of the base 11 is attached to the ceiling surface 531, however, the attachment part of the base 11 to the ceiling surface 531 is not limited to that.

In the robot 1, the connecting portion between the base 11 and the robot arm 6, i.e., a center line (center) 621 of a bearing portion 62 (see FIG. 4), which will be described later, is located on the upside of the ceiling surface 531 in the vertical direction. Note that the center line 621 of the bearing portion 62 is not limited to that, but may be located on the downside of the ceiling surface 531 in the vertical direction or located in the same position as that of the ceiling surface 531 in the vertical direction, for example.

The base 11 of the robot 1 is installed on the ceiling surface 531, and accordingly, the connecting portion between the first arm 12 and the second arm 13, i.e., a center line (center) of a bearing portion (not shown) that rotatably supports the second arm 13 is located on the downside of the center line 621 of the bearing portion 62 in the vertical direction.

Note that the base 11 may contain a joint 171 (see FIG. 2), which will be described later, or not.

Further, the first arm 12, the second arm 13, the third arm 14, the fourth arm 15, the fifth arm 16, and the sixth arm 17 are respectively supported independently displaceable with respect to the base 11.

As shown in FIGS. 1 and 3, the first arm 12 has a bending shape. In the state shown in FIG. 3, the first arm 12 has a first portion 121 connected to (provided on) the base 11 and extending from the base 11 in an axial direction of a first rotation axis O1 (vertical direction), which will be described later, downward in FIG. 3, a second portion 122 extending from the lower end of the first portion 121 in FIG. 3 in an axial direction of the second rotation axis O2 (horizontal direction) leftward in FIG. 3, a third portion 123 provided in the opposite end part of the second portion 122 to the first end portion 121 and extending in the axial direction of the first rotation axis O1 (vertical direction) downward in FIG. 3, and a fourth portion 124 extending from the opposite end part of the third portion 123 to the second portion 122 in the axial direction of the second rotation axis O2 (horizontal direction) rightward in FIG. 3. Note that these first portion 121, second portion 122, third portion 123, and fourth portion 124 are integrally formed. Further, the second portion 122 and the third portion 123 are nearly orthogonal (crossing) as seen from a direction orthogonal to both the first rotation axis O1 and the second rotation axis O2 (as seen from the near side of the paper of FIG. 3).

The second arm 13 has an elongated shape and is connected to (provided on) the distal end part of the first arm 12, i.e., the opposite end part of the fourth portion 124 to the third portion 123.

The third arm 14 has an elongated shape and is connected to (provided on) the distal end part of the second arm 13, i.e., the opposite end part to the end part of the second arm 13 to which the first arm 12 is connected.

The fourth arm 15 is connected to (provided on) the distal end part of the third arm 14, i.e., the opposite end part to the end part of the third arm 14 to which the second arm 13 is connected. The fourth arm 15 has a pair of supporting portions 151, 152 opposed to each other. The supporting portions 151, 152 are used for connection of the fourth arm 15 to the fifth arm 16.

The fifth arm 16 is located between the supporting portions 151, 152 and connected to the supporting portions 151, 152 to be coupled to the fourth arm 15 (provided on the fourth arm 15). Note that the structure of the fourth arm 15 is not limited to that, but may have e.g. only one supporting portion (cantilever).

The sixth arm 17 has a flat plate shape and is connected to (provided on) the distal end part of the fifth arm 16. Further, as an end effector, the hand 91 that grasps e.g. a precision apparatus such as a wristwatch, a component, or the like is detachably attached to the distal end part of the sixth arm 17 (the end part opposite to the fifth arm 16). Driving of the hand 91 is controlled by the control apparatus 200. Note that the hand 91 is not particularly limited, but includes e.g. a configuration having a plurality of finger portions (fingers). The robot 1 may perform respective work of carrying of the precision apparatus or component by controlling the operation of the arms 12 to 17 etc. while grasping the precision apparatus or component with the hand 91.

As shown in FIGS. 1 to 3, the first arm 12 is provided on the base 11. Thereby, when the robot 1 is installed, the base 11 is placed in a predetermined part of the installation space, and thus, the installation work may be easily performed.

Specifically, the base 11 and the first arm 12 are coupled via the joint 171. The joint 171 has a mechanism of rotatably supporting the first arm 12 relative to the base 11, which are coupled to each other. Thereby, the first arm 12 is rotatable around the first rotation axis O1 (about the first rotation axis O1) parallel to the vertical direction relative to the base 11. The first rotation axis O1 is aligned with the normal of the ceiling surface 531 of the ceiling 53 to which the base 11 is attached. Further, the first rotation axis O1 is a rotation axis located at the most upstream of the robot 1. The rotation about the first rotation axis O1 is made by driving of the first drive source 401 as a first drive unit (drive unit) having the first motor 401M and a reducer (not shown).

It is preferable that the rotation angle of the first arm 12 is set to 90° or less. Thereby, even in the case where there is an obstacle around the robot 1, the arm may easily avoid the obstacle and move and the takt time may be shortened.

Note that, hereinafter, the first motor 401M and a second motor 402M, a third motor 403M, a fourth motor 404M, a fifth motor 405M, and a sixth motor 406M, which will be described later, are respectively also referred to as "motor".

The first arm 12 and the second arm 13 are coupled via a joint 172. The joint 172 has a mechanism of rotatably supporting one of the first arm 12 and the second arm 13 that are coupled to each other relative to the other. Thereby, the second arm 13 is rotatable around the second rotation axis O2 (about the second rotation axis O2) parallel to the horizontal direction relative to the first arm 12. The second rotation axis O2 is orthogonal to the first rotation axis O1. The rotation about the second rotation axis O2 is made by driving of the second drive source 402 as a second drive unit (drive unit) having the second motor 402M and a reducer (not shown).

Note that the second rotation axis O2 may be parallel to an axis orthogonal to the first rotation axis O1, or the second rotation axis O2 is not necessarily orthogonal to the first rotation axis O1 as long as the axial directions may be different from each other.

The second arm 13 and the third arm 14 are coupled via a joint 173. The joint 173 has a mechanism of rotatably supporting one of the second arm 13 and the third arm 14 that are coupled to each other relative to the other. Thereby, the third arm 14 is rotatable around a third rotation axis O3 (about the third rotation axis O3) parallel to the horizontal direction relative to the second arm 13. The third rotation axis O3 is parallel to the second rotation axis O2. The rotation about the third rotation axis O3 is made by driving of the third drive source 403 as a third drive unit (drive unit) having the third motor 403M and a reducer (not shown).

The third arm 14 and the fourth arm 15 are coupled via a joint 174. The joint 174 has a mechanism of rotatably supporting one of the third arm 14 and the fourth arm 15 that are coupled to each other relative to the other. Thereby, the fourth arm 15 is rotatable around a fourth rotation axis O4 (about the fourth rotation axis O4) parallel to the center axial direction of the third arm 14 relative to the third arm 14 (base 11). The fourth rotation axis O4 is orthogonal to the third rotation axis O3. The rotation about the fourth rotation axis O4 is made by driving of the fourth drive source 404 as a fourth drive unit (drive unit) having the fourth motor 404M and a reducer (not shown).

Note that the fourth rotation axis O4 may be parallel to an axis orthogonal to the third rotation axis O3, or the fourth rotation axis O4 is not necessarily orthogonal to the third rotation axis O3 as long as the axial directions may be different from each other.

The fourth arm 15 and the fifth arm 16 are coupled via a joint 175. The joint 175 has a mechanism of rotatably supporting one of the fourth arm 15 and the fifth arm 16 that are coupled to each other relative to the other. Thereby, the fifth arm 16 is rotatable around a fifth rotation axis O5 (about the fifth rotation axis O5) orthogonal to the center axial direction of the fourth arm 15 relative to the fourth arm 15. The fifth rotation axis O5 is orthogonal to the fourth rotation axis O4. The rotation about the fifth rotation axis O5 is made by driving of the fifth drive source 405 as a fifth drive unit (drive unit). The fifth drive source 405 has the fifth motor 405M, a reducer (not shown), a first pulley (not shown) coupled to the shaft portion of the fifth motor 405M, a second pulley (not shown) placed apart from the first pulley and coupled to the shaft portion of the reducer, and a belt (not shown) looped over the first pulley and the second pulley.

Note that the fifth rotation axis O5 may be parallel to an axis orthogonal to the fourth rotation axis O4, or the fifth rotation axis O5 is not necessarily orthogonal to the fourth rotation axis O4 as long as the axial directions may be different from each other.

The fifth arm 16 and the sixth arm 17 are coupled via a joint 176. The joint 176 has a mechanism of rotatably supporting one of the fifth arm 16 and the sixth arm 17 that are coupled to each other relative to the other. Thereby, the sixth arm 17 is rotatable around a sixth rotation axis O6 (about the sixth rotation axis O6) relative to the fifth arm 16. The sixth rotation axis O6 is orthogonal to the fifth rotation axis O5. The rotation about the sixth rotation axis O6 is made by driving of the sixth drive source 406 as a sixth drive unit (drive unit) having the sixth motor 406M and a reducer (not shown).

Note that the sixth rotation axis O6 may be parallel to an axis orthogonal to the fifth rotation axis O5, or the sixth rotation axis O6 is not necessarily orthogonal to the fifth rotation axis O5 as long as the axial directions may be different from each other.

In the drive sources 401 to 406, the reducers may be respectively omitted. In the arms 12 to 17, brakes (braking devices) for braking the arms 12 to 17 may be provided or omitted.

The motors 401M to 406M are not particularly limited, but include e.g. servo motors such as AC servo motors or DC servo motors.

The respective brakes are not particularly limited, but include e.g. electromagnetic brakes.

In the motors 401M to 406M or the respective reducers of the drive sources 401 to 406, a first encoder as a first position detection part that detects the position of the first arm 12, a second encoder as a second position detection part that detects the position of the second arm 13, a third encoder as a third position detection part that detects the position of the third arm 14, a fourth encoder as a fourth position detection part that detects the position of the fourth arm 15, a fifth encoder as a fifth position detection part that detects the position of the fifth arm 16, and a sixth encoder as a sixth position detection part that detects the position of the sixth arm 17 (all encoders are not shown) are provided, respectively. By the respective encoders, the rotation angles of the rotation shafts of the motors 401M to 406M or the respective reducers of the drive sources 401 to 406 are detected.

As above, the configuration of the robot 1 is briefly explained.

Next, the relationships among the first arm 12 to the sixth arm 17 will be explained in various expressions or the like from various viewpoints. The third arm 14 to the sixth arm 17 are considered in the states in which the arms are extended straight, that is, the arms are the longest, and, in other words, the fourth rotation axis O4 and the sixth rotation axis O6 are aligned or parallel.

First, it is assumed that the first arm 12 is provided on the base 11. Thereby, the first arm 12 can be rotated relative to the base 11.

Further, the first arm 12 is rotatable about the first rotation axis O1 and the axial direction of the second rotation axis O2 is orthogonal to (different from) the axial direction of the first rotation axis O1.

As shown in FIG. 4, a length L1 of the first arm is longer than a length L2 of the second arm 13. Thereby, the first arm 12 and the second arm 13 may easily overlap as seen from the axial direction of the second rotation axis O2.

Here, the length L1 of the first arm 12 is a distance between the second rotation axis O2 and the center line 621 extending in the leftward and rightward directions in FIG. 4 of the bearing portion 62 that rotatably supports the first arm 12 as seen from the axial direction of the second rotation axis O2.

The length L2 of the second arm 13 is a distance between the second rotation axis O2 and the third rotation axis O3 as seen from the axial direction of the second rotation axis O2.

As shown in FIG. 5, an angle θ formed by the first arm 12 and the second arm 13 (see FIG. 4) can be set to 0° as seen from the axial direction of the third rotation axis O3. In other words, the first arm 12 and the second arm 13 can overlap, that is, the first arm 12 and the second arm 13 can be in an overlap state as seen from the axial direction of the third rotation axis O3. Thereby, the space for avoiding interferences of the robot 1 with a nearby wall (not shown) or a peripheral device (not shown) when the distal end of the robot arm 6 is moved to a position different by 180° about the first rotation axis O1 may be made smaller.

Further, the second arm 13 is formed not to interfere with the ceiling surface 531 of the ceiling 53 on which the base 11 is provided and the second portion 122 of the first arm 12 when the angle angle θ is 0°, that is, when the first arm 12 and the second arm 13 overlap as seen from the axial direction of the third rotation axis O3. Note that, similarly, the second arm 13 is formed not to interfere with the ceiling surface 531 and the second portion 122 of the first arm 12 when the proximal end surface of the base 11 is attached to the ceiling surface 531.

Here, the angle θ formed by the first arm 12 and the second arm 13 is an angle formed by a straight line 61 passing through the second rotation axis O2 and the third rotation axis O3 (the center axis of the second arm 13 as seen from the axial direction of the second rotation axis O2) and the first rotation axis O1 as seen from the axial direction of the second rotation axis O2 (see FIG. 4).

The second arm 13 is rotated without rotation of the first arm 12, and thereby, the distal end of the second arm 13 can be moved to the position different by 180° about the first rotation axis O1 through the state in which the angle θ is 0° as seen from the axial direction of the second rotation axis O2 (the state in which the first arm 12 and the second arm 13 overlap). That is, the second arm 13 is rotated without rotation of the first arm 12, and thereby, the distal end of the robot arm 6 (the distal end of the sixth arm 17) can be moved from the left position shown in FIGS. 1 and 4 to the right position different by 180° about the first rotation axis O1 (the opposite position to that in FIG. 1 around the first rotation axis O1) through the state in which the angle θ is 0° (see FIG. 5). Note that the third arm 14 to sixth arm 17 are respectively rotated as appropriate.

When the distal end of the second arm 13 is moved to the position different by 180° about the first rotation axis O1 (when the distal end of the robot arm 6 is moved from the left position to the right position), the distal end of the second arm 13 and the distal end of the robot arm 6 move in straight lines as seen from the axial direction of the first rotation axis O1.

A total length (the maximum length) L3 of the third arm 14 to sixth arm 17 is set to be longer than the length L2 of the second arm 13.

Thereby, when the second arm 13 and the third arm 14 are overlapped as seen from the axial direction of the second rotation axis O2, the distal end of the sixth arm 17 may be projected from the second arm 13. Thereby, the hand 91 can be prevented from interfering with the first arm 12 and the second arm 13.

Here, the total length (the maximum length) L3 of the third arm 14 to sixth arm 17 is a distance between the third rotation axis O3 and the distal end of the sixth arm 17 as seen from the axial direction of the second rotation axis O2 (see FIG. 4). In this case, regarding the third arm 14 to sixth arm 17, as shown in FIG. 4, the fourth rotation axis O4 and the sixth rotation axis O6 are aligned or parallel.

As shown in FIG. 5, the second arm 13 and the third arm 14 can overlap as seen from the axial direction of the third rotation axis O3.

That is, the first arm 12, the second arm 13, and the third arm 14 can overlap at the same time as seen from the axial direction of the third rotation axis O3.

In the robot 1, the above described relationships are satisfied and the second arm 13 and the third arm 14 are rotated without rotation of the first arm 12, and thereby, the hand 91 (the distal end of the sixth arm 17) may be moved to the position different by 180° about the first rotation axis O1 through the state in which the angle θ formed by the first arm 12 and the second arm 13 is 0° (the state in which the first arm 12 and the second arm 13 overlap) as seen from the axial direction of the third rotation axis O3. Then, the robot 1 may be driven efficiently using the action, the space provided for avoiding interferences of the robot 1 with a nearby wall (not shown) or a peripheral device (not shown) may be made smaller, and various advantages to be described last are obtained.

As shown in FIG. 7, the robot 1 has a cable 20 with a plurality of wires (not shown) inside as a flexible member having an elongated shape. The wires include e.g. electrical wires etc. The number of the cable 20 is not particularly limited, but one in the embodiment. Note that the number of cables 20 may be two or more.

The cable 20 is placed inside of the robot arm 6, more specifically, inside of the first arm 12, inside of the second arm 13, inside of the third arm 14, inside of the fourth arm 15, etc. (only the fourth arm 15 is not shown), that is, placed through the respective insides. The cable 20 has portions placed in spaces between the drive sources (drive units) and the covers including the space between the second drive source 402 (drive unit) and the cover 125 of the first arm 12 and the cover 135 of the second arm 13. Specifically, the cable 20 has a folded-back portion 21a, a first portion 22a, and a second portion 23a placed on the outer circumference of the motor 401M, a folded-back portion 21b, a first portion 22b, and a second portion 23b placed on the outer circumference of the motor 402M, a folded-back portion 21c, a first portion 22c, and a second portion 23c placed on the outer circumference of the motor 403M, and a folded-back portion, a first portion, and a second portion (not shown) placed on the outer circumference of the motor 404M. The respective folded-back portions are provided in the cable 20, and thereby, the space inside of the robot arm 6 may be effectively utilized.

Note that the respective folded-back portions, first portions, and second portions and the configurations near the portions are the same, and, as below, the folded-back portion 21b, the first portion 22b, and the second portion 23b placed on the outer circumference of the motor 402M will be representatively explained as examples.

The folded-back portion 21b of the cable 20 is placed to be folded back in the circumferential direction of the shaft portion (output shaft) of the motor 402M, that is, in the circumferential direction of the second rotation axis O2 (see FIG. 3) in a U-shape (bent in a U-shape) on the outer circumference of the motor 402M.

The first portion 22b having an arc shape along the outer circumference of the motor 402M is in one end part of the folded-back portion 21b, and an end part of the first portion 22b is fixed to a supporting member 45 of the motor 402M by a fixing member (not shown). Further, the second portion 23b having an arc shape along the outer circumference of the motor 402M is in the other end part of the folded-back portion 21b, and an end part of the second portion 23b is fixed to a rotating member 43 of the reducer rotatable relative to the motor 402M by a fixing member (not shown). The rotating member 43 is fixed to the second arm 13 and the motor 402M is fixed to the first arm 12. That is, the cable 20 is fixed to the first arm 12 in the end part of the first portion 22b and fixed to the second arm 13 in the end part of the second portion 23b.

When the motor 402M drives the second arm 13 to rotate, the rotating member 43 rotates relative to the motor 402M and, in this regard, twist of the folded-back portion 21b is suppressed and the portion bendingly deforms. Thereby, stress acting on the cable 20 is relaxed. That is, in the folded-back portion 21b, the bend radius of the cable 20 may be secured to be larger and, when the second arm 13 rotates, twist and breakage of the cable 20 may be suppressed, and thereby, damage on the cable 20 may be suppressed and durability may be improved.

Here, grease as an example of a lubricant is applied to the cable 20. By the grease, friction resistance of the cable 20 may be reduced, sliding may be improved, and wear or the like of the cable 20 may be suppressed. Note that the grease may be omitted.

The grease is not particularly limited, but penetration (worked penetration) of the grease (lubricant) is preferably from 150 to 300, more preferably from 150 to 260, and yet more preferably from 200 to 260. Thereby, regarding the grease, moderate hardness is obtained. If the penetration of the grease is larger than the upper limit value, the grease may be too soft and unsuitable depending on the other conditions. Or, if the penetration of the grease is smaller than the lower limit value, the grease may be too hard and unsuitable depending on the other conditions.

In the robot 1, a non-contact seal structure is formed in a part between the base 11 and the cover 125 of the first arm 12 by the base 11 and the cover 125. Similarly, a non-contact seal structure is formed in a part between the cover 125 of the first arm 12 and the cover 135 of the second arm 13 by the cover 125 and the cover 135. Similarly, a non-contact seal structure is formed in a part between the cover 135 of the second arm 13 and the cover 145 of the third arm 14 by the cover 135 and the cover 145. Similarly, a non-contact seal structure is formed in a part between the cover 145 of the third arm 14 and the cover 155 of the fourth arm 15 by the cover 145 and the cover 155. The respective non-contact seal structures are the same and, as below, the non-contact seal structure formed by the cover 125 of the first arm 12 and the cover 135 of the second arm 13 will be representatively explained as an example. Hereinafter, the non-contact seal structure formed by the cover 125 and the cover 135 or a part of the non-contact seal structure is referred to as "non-contact seal structure part" (the same applies to the other embodiments).

Here, the non-contact seal structure refers to a structure with a gap between the cover 125 and the cover 135 to improve sealing performance using the gap.

The form of the non-contact seal structure is not particularly limited, but, in the robot 1, a labyrinth structure (labyrinth seal structure) is employed as the non-contact seal structure. That is, the non-contact seal structure is the labyrinth structure in the embodiment. Thereby, a distance La (extension length) of a first gap 71 extending between inside and outside of the robot arm 6 in the part between the cover 125 and the cover 135 may be made longer and the sealing performance within the robot arm 6 may be improved.

The labyrinth structure refers to a structure in which a concavo-convex structure is provided between the cover 125 and the cover 135 and a concavo-convex gap is formed between the cover 125 and the cover 135.

Note that the non-contact seal structure may be omitted and, e.g. a normal gap may be formed.

As below, a non-contact seal structure part 7 will be explained.

First, it is assumed that the robot 1 has the robot arm 6, and the robot arm 6 has the first arm 12 and the second arm 13 provided on the first arm 12 rotatably about the second rotation axis O2. Further, the first arm 12 has the cover 125 and the second arm 13 has the cover 135. Furthermore, the cable 20 having the wires (not shown) inside is placed between the second drive source 402 and the cover 125 of the first arm 12. Moreover, the cable 20 is placed between the second drive source 402 and the cover 135 of the second arm 13.

The non-contact seal structure part 7 (non-contact seal structure) is formed by the cover 125 of the first arm 12 and the cover 135 of the second arm 13 (see FIG. 8). As below, the specific explanation will be made.

As shown in FIG. 8, a rib (projecting wall) 127 as an example of a convex portion is formed in an end portion 126 of the cover 125, i.e., a part of the cover 125 facing the cover 135. Similarly, a rib (projecting wall) 137 as an example of the convex portion is formed in an end portion 136 of the cover 135, i.e., a part of the cover 135 facing the cover 125 inside (on the inner circumferential side) of the rib 127. The ribs 127, 137 respectively project in the axial directions of the second rotation axis O2 and are formed to make circuits around the second rotation axis O2. Further, the rib 137 is placed inside (on the inner circumferential side) of the rib 127. Note that the rib 137 may be placed outside (on the outer circumferential side) of the rib 127.

The cover 125 and the cover 135 are placed in the non-contact state. That is, the rib 127 and the rib 137 and end portion 136 are placed in the non-contact state with each other and the rib 137 and the end portion 126 are placed in the non-contact state with each other. Thereby, when the robot arm 6 (robot 1) is driven, friction between the cover 125 and the cover 135 may be suppressed.

According to the configuration, the first gap 71 (space) is formed between the cover 125 (first arm 12) and the cover 135 (second arm 13). That is, the non-contact seal structure part 7 (non-contact seal structure) has the first gap 71 formed between the cover 125 of the first arm 12 and the cover 135 of the second arm 13. In the section along the second rotation axis O2, the first gap 71 has first gap portions 711, 713 extending in a direction crossing the axial direction of the second rotation axis O2, and a second gap portion 712 extending in a direction orthogonal to (crossing) the direction in which the first gap portions 711, 713 extend and communicating with the first gap portions 711, 713.

Specifically, the first gap 71 includes the first gap portion 711 mainly formed between the end portion 126 and an end portion 1371 of the rib 137, the second gap portion 712 mainly formed between the rib 127 and the rib 137, and the first gap portion 713 (third gap portion) mainly formed between the end portion 136 and an end portion 1271 of the rib 127. The first gap portion 711, the second gap portion 712, and the first gap portion 713 are sequentially placed from inside toward outside of the robot arm 6, and the first gap portion 711 and the second gap portion 712 communicate and the second gap portion 712 and the first gap portion 713 communicate.

In the section along the second rotation axis O2 (in the sectional view shown in FIG. 8), the first gap portion 711 and the first gap portion 713 respectively extend in the direction orthogonal to (crossing) the axial direction of the second rotation axis O2, i.e., the radial direction. Further, the first gap portion 711 and the first gap portion 713 respectively extend to make circuits around the second rotation axis O2.

In the section along the second rotation axis O2, the second gap portion 712 extends in the direction orthogonal to (crossing) the direction in which the first gap portion 711 extends, i.e., the axial direction of the second rotation axis O2. Further, the second gap portion 712 extends to make a circuit around the second rotation axis O2.

The non-contact seal structure part 7 includes the first gap 71, the end portion 126, the end portion 136, the rib 127, the rib 137, etc.

The non-contact seal structure part 7 having the labyrinth structure is provided, and thereby, the distance La (extension length) of the first gap 71 extending between inside and outside of the robot arm 6 in the part between the cover 125 and the cover 135 may be made longer and the sealing performance within the robot arm 6 may be improved. That is, by the non-contact seal structure part 7, when the robot arm 6 is driven, leakage of foreign matter including the grease and abrasion powder of the cable 20 from between the cover 125 and the cover 135 may be suppressed. Further, mixing of foreign matter from between the cover 125 and the cover 135 into the robot arm 6 may be suppressed.

The distance La of the first gap 71 is not particularly limited, but appropriately set according to conditions. The distance is preferably equal to or larger than 3 mm, more preferably from 5 mm to 500 mm, and yet more preferably from 7 mm to 50 mm.

If the distance La is larger than the upper limit value, the structure of the non-contact seal structure part 7 becomes complex. Or, if the distance La is smaller than the lower limit value, depending on the other conditions, when the robot arm 6 is driven, foreign matter including the grease and abrasion powder of the cable 20 may leak from between the cover 125 and the cover 135.

A distance between the cover 125 and the cover 135 forming (defining) the first gap 71, i.e., a distance Lb (gap length) of the first gap 71 is not particularly limited, but appropriately set according to conditions. The distance is preferably equal to or smaller than 5 mm, more preferably from 0.1 mm to 5 mm, and yet more preferably from 0.1 mm to 3 mm (e.g. 1 mm).

If the distance Lb is larger than the upper limit value, depending on the other conditions, when the robot arm 6 is driven, foreign matter including the grease and abrasion powder of the cable 20 may leak from between the cover 125 and the cover 135. Or, if the distance Lb is smaller than the lower limit value, depending on the other conditions, when the robot arm 6 is driven, the cover 125 and the cover 135 may be in friction.

Note that the distance Lb may be constant along the direction in which the first gap 71 extends or changed. For example, the distance Lb of the first gap portion 711, the distance Lb of the second gap portion 712, and the distance Lb of the first gap portion 713 may be the same or different. Further, the distance Lb of the first gap portion 711 may be constant along the direction in which the first gap portion 711 extends or changed. The distance Lb of the second gap portion 712 may be constant along the direction in which the second gap portion 712 extends or changed. The distance Lb of the first gap portion 713 may be constant along the direction in which the first gap portion 713 extends or changed.

The non-contact seal structure part 7 (non-contact seal structure) has grease (not shown) inside as an example of the lubricant. That is, the grease is provided in the first gap 71. Thereby, at least a part of the first gap 71 is filled with the grease and shielded. Thus, when the robot arm 6 is driven, leakage of foreign matter including the abrasion powder of the cable 20 from between the cover 125 and the cover 135 may be suppressed. Further, mixing of foreign matter from between the cover 125 and the cover 135 into the robot arm 6 may be suppressed. Note that the grease may be omitted.

The grease provided in the first gap 71 is not particularly limited, but may be the same as the grease applied to the cable 20 or different.

The method of providing the grease in the first gap 71 is not particularly limited, but, for example, when the robot arm 6 is driven, the grease applied to the cable 20 may be moved and accumulated in the first gap 71. Or, the grease may be provided separately from that for the cable 20 in the manufacturing process of the robot 1.

The grease provided in the first gap 71 is not particularly limited, but penetration (worked penetration) of the grease (lubricant) is preferably from 150 to 300, more preferably from 150 to 260, and yet more preferably from 200 to 260. Thereby, regarding the grease, moderate hardness is obtained. Thus, leakage of the grease may be suppressed.

If the penetration of the grease is larger than the upper limit value, the grease may be too soft and unsuitable depending on the other conditions. Or, if the penetration of the grease is smaller than the lower limit value, the grease may be too hard and unsuitable depending on the other conditions.

As shown in FIGS. 1, 9, and 10, the robot 1 has a tube 5. The tube 5 has flexibility, and enters the robot 1 from the base 11 and is placed inside of the robot arm 6. Further, a pump 4 (suction device) (see FIG. 1) is connected to the proximal end part of the tube 5. The pump 4 may be regarded as a component element of the robot system 100 or not regarded as a component element of the robot system 100. The pump 4 is a suction pump that can suction and driving of the pump 4 is controlled by the control apparatus 200 (see FIG. 6). Note that the driving of the pump 4 may be controlled by e.g. another personal computer or the like, not by the control apparatus 200, or the pump 4 may be operated to be on and off by manual operation.

As shown in FIG. 10, the tube 5 is placed along the cable 20. Thereby, abrasion powder of the cable 20 may be suctioned, and another space for placement of the tube 5 is unnecessary and the robot 1 may be downsized. Note that the tube 5 may be placed not along the cable 20.

The cable 20 includes a first fixing portion 31 that fixes the cable 20 to the first arm 12 and a second fixing portion 32 that fixes the cable 20 to the second arm 13. The first fixing portion 31 and the second fixing portion 32 are respectively not particularly limited, but include e.g. clamping bands. In the embodiment, the first fixing portion 31 also serves as a fixing portion that fixes the tube 5 to the first arm 12, and the second fixing portion 32 also serves as a fixing portion that fixes the tube 5 to the second arm 13. That is, the first fixing portion 31 fixes the tube 5 and the cable 20 to the first arm 12, and the second fixing portion 32 fixes the tube 5 and the cable 20 to the second arm 13.

The cable 20 is folded back between the first fixing portion 31 and the second fixing portion 32. The folded-back portion is the above described folded-back portion 21b and slidable. That is, the folded-back portion 21b is the portion folded back between the first fixing portion 31 and the second fixing portion 32 and slidable with respect to the motor 402M. The same applies to the other folded-back portions.

The tube 5 is folded back between the first fixing portion 31 and the second fixing portion 32 like the cable 20. That is, the tube 5 has a folded-back portion 52 placed to be folded back in the circumferential direction of the shaft portion (output shaft) of the motor 402M, that is, in the circumferential direction of the second rotation axis O2 in a U-shape (bended in a U-shape) on the outer circumference of the motor 402M.

An opening formed in one end surface (distal end surface) of the tube 5 is a suction hole 51. That is, the suction hole 51 is the opening provided in the distal end surface of the tube 5. Further, the suction hole 51 is placed inside of the robot arm 6. The pump 4 (suction device) (see FIG. 1) is connected to the other end portion of the tube 5, and the gas inside of the robot arm 6 can be suctioned from the suction hole 51 by driving of the pump 4. Thereby, the interior of the robot arm 6 may be set at negative pressure, foreign matter including grease within the robot arm 6 and abrasion powder of the cable 20 may be suctioned, and the foreign matter coming out from inside of the robot arm 6 via the first gap 71 may be suppressed.

The number of the suction hole 51 is not particularly limited, but may be one or more. In the embodiment, the number is one.

The robot arm 6 has a second gap 72 (see FIG. 7) between the second arm 13 and the third arm 14. As described above, the second gap 72 has the same configuration as the first gap 71.

The suction hole 51 of the tube 5 is placed closer to the opposite side to the folded-back portion 21b than the first fixing portion 31 and the second fixing portion 32.

Specifically, the suction hole 51 of the tube 5 is placed between the first gap 71 and the second gap 72 as seen from the axial direction of the second rotation axis O2. That is, the suction hole 51 is placed between the joint 172 and the joint 173. Thereby, foreign matter coming out from the first gap 71 and the second gap 72 may be suppressed.

The suction hole 51 of the tube 5 may be placed in any position between the first gap 71 and the second gap 72 as long as the position may be between the first gap 71 and the second gap 72, however, in the embodiment, the suction hole 51 is placed in an intermediate position between the first gap 71 and the second gap 72.

Note that, in the embodiment, the mechanism for suppressing coming out of foreign matter produced in the joints 172, 173 is representatively explained, however, a mechanism for suppressing coming out of foreign matter produced in other joints can be provided similarly or with changes. Or, the suction hole 51 may be placed in another position than that between the first gap 71 and the second gap 72.

As described above, according to the robot 1 (robot system 100), when the robot arm 6 is driven, foreign matter including the grease and abrasion powder of the cable 20 coming out from between the cover 125 and the cover 135 may be suppressed. Similarly, foreign matter including the grease and abrasion powder of the cable 20 coming out from between the covers of the other adjacent two arms or between the cover 125 and the base 11 may be suppressed.

Thereby, cleanliness within the room in which the robot 1 is installed may be easily and appropriately secured.

The leakage of the grease from inside of the robot arm 6 to outside may be suppressed and it is not necessary to strictly control the amount of the grease applied to the cable 20, and thereby, time and effort taken for assembly of the robot 1 may be reduced.

The non-contact seal structure part 7 is provided, and thereby, mixing of foreign matter from between the cover 125 and the cover 135 into the robot arm 6 may be suppressed. Similarly, mixing of foreign matter from between the covers of the other adjacent two arms or between the cover 125 and the base 11 into the robot arm 6 may be suppressed.

As described above, in the robot 1, the second arm 13, the third arm 14, etc. are rotated without rotation of the first arm 12, and thereby, the distal end of the robot arm 6 may be moved to the position different by 180° about the first rotation axis O1 through the state in which the angle θ formed by the first arm 12 and the second arm 13 is 0° (the state in which the first arm 12 and the second arm 13 overlap) as seen from the axial direction of the second rotation axis O2.

Thereby, the space for avoiding interferences of the robot 1 with a nearby wall (not shown) or a peripheral device (not shown) may be made smaller.

First, the ceiling 53 may be made lower, and thereby, the position of the center of gravity of the robot 1 may be lower and the influence of the vibration of the robot 1 may be reduced. That is, the vibration generated by the reaction force due to the action of the robot 1 may be suppressed.

Further, the working range of the robot 1 in the width directions (the directions of the production line) may be made narrower, and thereby, more robots 1 may be placed per unit length along the production line and the production line may be made shorter.

When the robot arm 6 is driven, the movement of the robot 1 may be reduced. For example, rotation of the first arm 12 is not made or the rotation angle of the first arm 12 may be made smaller, and thereby, takt time may be shortened and the work efficiency may be improved.

If the action of moving the distal end of the robot arm 6 to the position different by 180° about the first rotation axis O1 (hereinafter, also referred to as "shortcut motion") is executed simply by rotation of the first arm 12 about the first rotation axis O1 as in a robot of related art, the robot 1 may interfere with a nearby wall (not shown) or a peripheral device (not shown), and it is necessary to teach an evacuation point for avoiding the interference to the robot 1. For example, if only the first arm 12 is rotated by 90° about the first rotation axis O1 and the robot 1 interferes with the wall, it is necessary to teach an evacuation point for avoiding the interference with the wall by also rotating another arm. Similarly, if the robot 1 also interferes with the peripheral device, it is necessary to further teach an evacuation point for avoiding the interference with the peripheral device. As described above, in the robot of related art, it is necessary to teach many evacuation points and, particularly, when the space around the robot is small, an enormous number of evacuation points are necessary and lots of effort and time are taken for the teaching.

On the other hand, in the robot 1, when the shortcut motion is executed, regions and parts that may interfere are few and the number of evacuation points to teach may be reduced and effort and time taken for teaching may be reduced. That is, in the robot 1, the number of evacuation points to teach is e.g. about one-third of that of the robot of related art and the teaching is remarkably easier.

A region (part) 101 surrounded by dashed two-dotted lines on the right of the third arm 14 and the fourth arm 15 in FIG. 3 is a region (part) in which the robot 1 does not or is hard to interfere with the robot 1 itself and other members. Accordingly, when a predetermined member is mounted on the region, the member is hard to interfere with the robot 1, a peripheral device, or the like. Accordingly, in the robot 1, the predetermined member can be mounted on the region. Particularly, when the predetermined member is mounted on the region on the right of the third arm 14 in FIG. 3 of the region 101, the probability of the interference of the member with a peripheral device (not shown) placed on a worktable is lower and the region is more effective.

The member that can be mounted on the region includes e.g. a controller that controls driving of a sensor of a hand, hand eye camera, or the like and an electromagnetic valve of the suction mechanism.

As a specific example, in the case where the suction mechanism is provided in the hand, if the electromagnetic valve or the like is provided in the region 101, the electromagnetic valve does not get in the way when the robot 1 is driven. As described above, the region 101 is highly convenient.

Note that, in the embodiment, the numbers of the rib 127 and rib 137 are respectively one, however, not limited to those. For example, the numbers of the ribs 127 and ribs 137 may be two or more.

Further, in the embodiment, the rib 127 and the rib 137 respectively project in the axial directions of the second rotation axis O2, however, the ribs are not limited to those. For example, the rib 127 and the rib 137 may respectively project in the directions orthogonal to the second rotation axis O2 (radial directions).

As described above, the robot 1 includes the base 11, and the robot arm 6 having the first arm 12 provided on the base 11 rotatably about the first rotation axis O1 and the second arm 13 provided on the first arm 12 rotatably about the second rotation axis O2, the cable 20 placed inside of the robot arm 6, the tube 5 having the suction hole 51 for suctioning the gas inside of the robot arm 6 with the pump 4 connected thereto, and the first gap 71 is provided between the first arm 12 and the second arm 13 and the suction hole 51 is placed inside of the robot arm 6.

According to the robot 1, the gas inside of the robot arm 6 is suctioned, and thereby, the interior of the robot arm 6 may be set at negative pressure, foreign matter including grease and abrasion powder of the cable 20 coming out from inside of the robot arm 6 via the first gap 71 may be suppressed.

The suction hole 51 is the opening provided in the end surface of the tube 5. Thereby, the gas inside of the robot arm 6 may be appropriately suctioned.

Further, the tube 5 is placed along the cable 20. Thereby, abrasion powder of the cable 20 may be appropriately suctioned, and another space for placement of the tube 5 is unnecessary and the robot 1 may be downsized.

The robot arm 6 includes the first fixing portion 31 that fixes the cable 20 to the first arm 12, and the second fixing portion 32 that fixes the cable 20 to the second arm 13. Further, the cable 20 has the folded-back portion 21b as the example of the portion folded back between the first fixing portion 31 and the second fixing portion 32 and slidable. The suction hole is placed closer to the opposite side to the folded-back portion 21b (slidable portion) than the first fixing portion 31 and the second fixing portion 32. Thereby, the gas inside of the robot arm 6 may be appropriately suctioned.

The robot arm 6 has the third arm 14 provided on the second arm 13 rotatably about the third rotation axis O3 and has the second gap 72 between the second arm 13 and the third arm 14. Further, the suction hole 51 is placed between the first gap 71 and the second gap 72 as seen from the axial direction of the second rotation axis O2. Thereby, foreign matter coming out from the first gap 71 and the second gap 72 may be suppressed.

Second Embodiment

Figure 11:
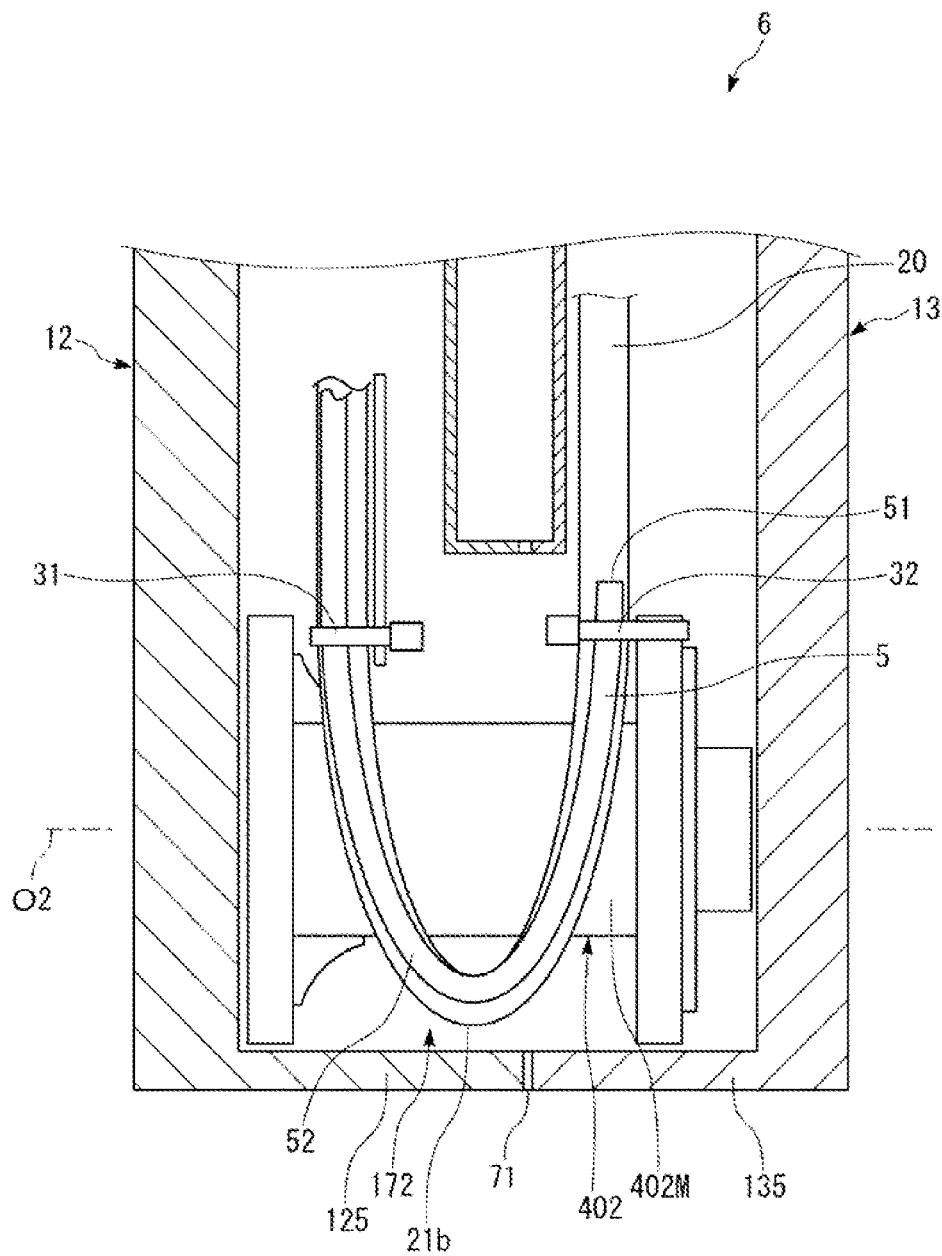
FIG. 11 is a sectional view schematically showing a section of the first arm and the second arm in a second embodiment of the robot according to the invention.

FIG. 11 is a sectional view schematically showing a section of the first arm and the second arm in the second embodiment of the robot according to the invention.

As below, the second embodiment will be explained with a focus on differences from the above described embodiment and the explanation of the same items will be omitted.

As shown in FIG. 11, in the robot 1 of the embodiment, the suction hole 51 of the tube 5 is placed closer to the opposite side to the folded-back portion 21b than the first fixing portion 31 and the second fixing portion 32. The suction hole 51 is placed near the exit of the cable 20 from the joint 172. In this case, the first fixing portion 31 side is set to the entrance side of the cable 20 and the second fixing portion 32 side is set to the exit side of the cable 20. Thereby, the gas inside of the robot arm 6 may be appropriately suctioned.

Note that, in the embodiment, the configuration in the joint 172 is representatively explained, however, the same configuration may be employed in the other joints.

According to the second embodiment, the same advantages as those of the above described embodiment may be offered.

Third Embodiment

Figure 12:
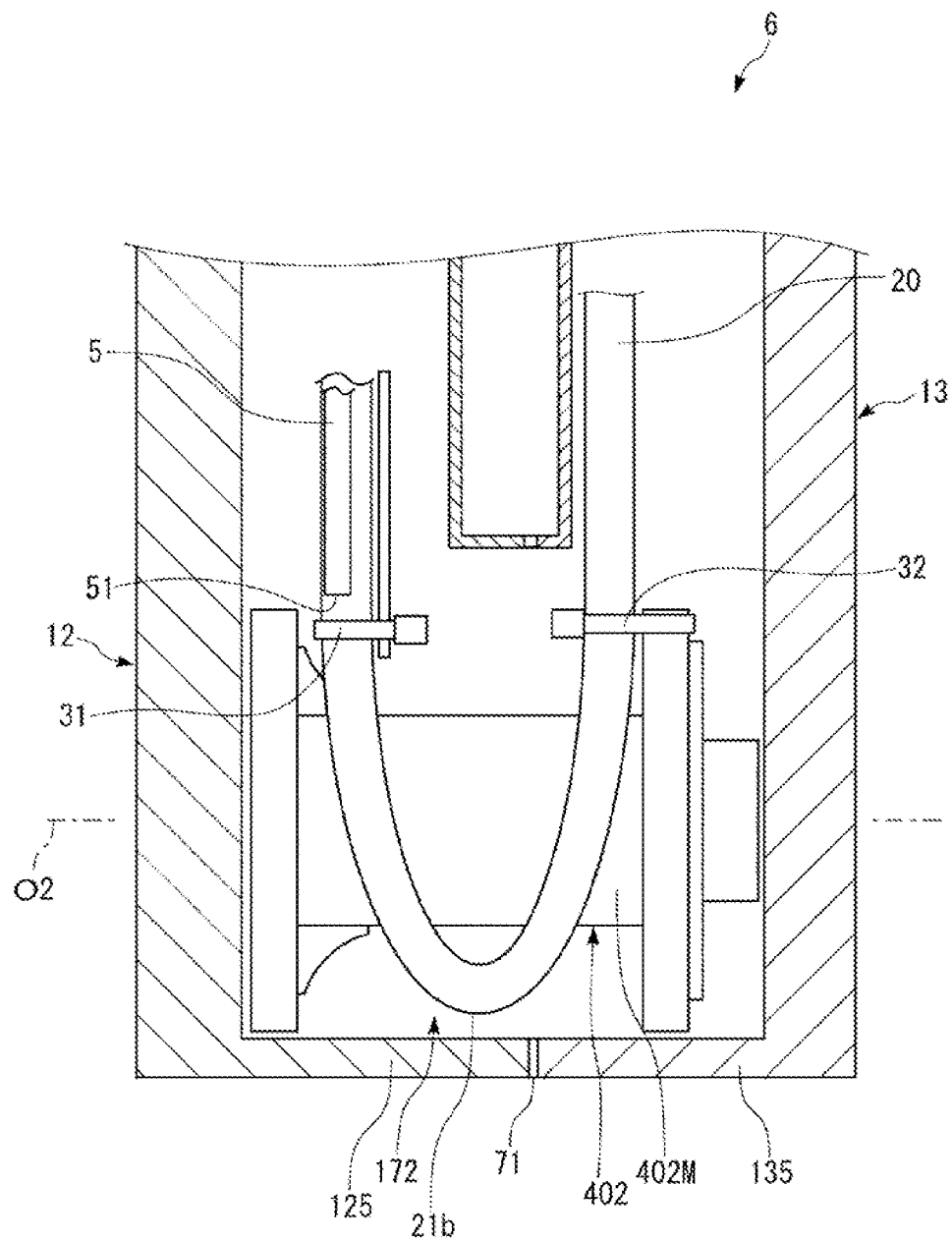
FIG. 12 is a sectional view schematically showing a section of the first arm and the second arm in a third embodiment of the robot according to the invention.

FIG. 12 is a sectional view schematically showing a section of the first arm and the second arm in the third embodiment of the robot according to the invention.

As below, the third embodiment will be explained with a focus on differences from the above described embodiments and the explanation of the same items will be omitted.

As shown in FIG. 12, in the robot 1 of the embodiment, the suction hole 51 of the tube 5 is placed closer to the opposite side to the folded-back portion 21b than the first fixing portion 31 and the second fixing portion 32. The suction hole 51 is placed near the entrance of the cable 20 into the joint 172. In this case, the first fixing portion 31 side is set to the entrance side of the cable 20 and the second fixing portion 32 side is set to the exit side of the cable 20. Thereby, the gas inside of the robot arm 6 may be appropriately suctioned.

Note that, in the embodiment, the configuration in the joint 172 is representatively explained, however, the same configuration may be employed in the other joints.

According to the third embodiment, the same advantages as those of the above described embodiments may be offered.

Fourth Embodiment

Figure 13:
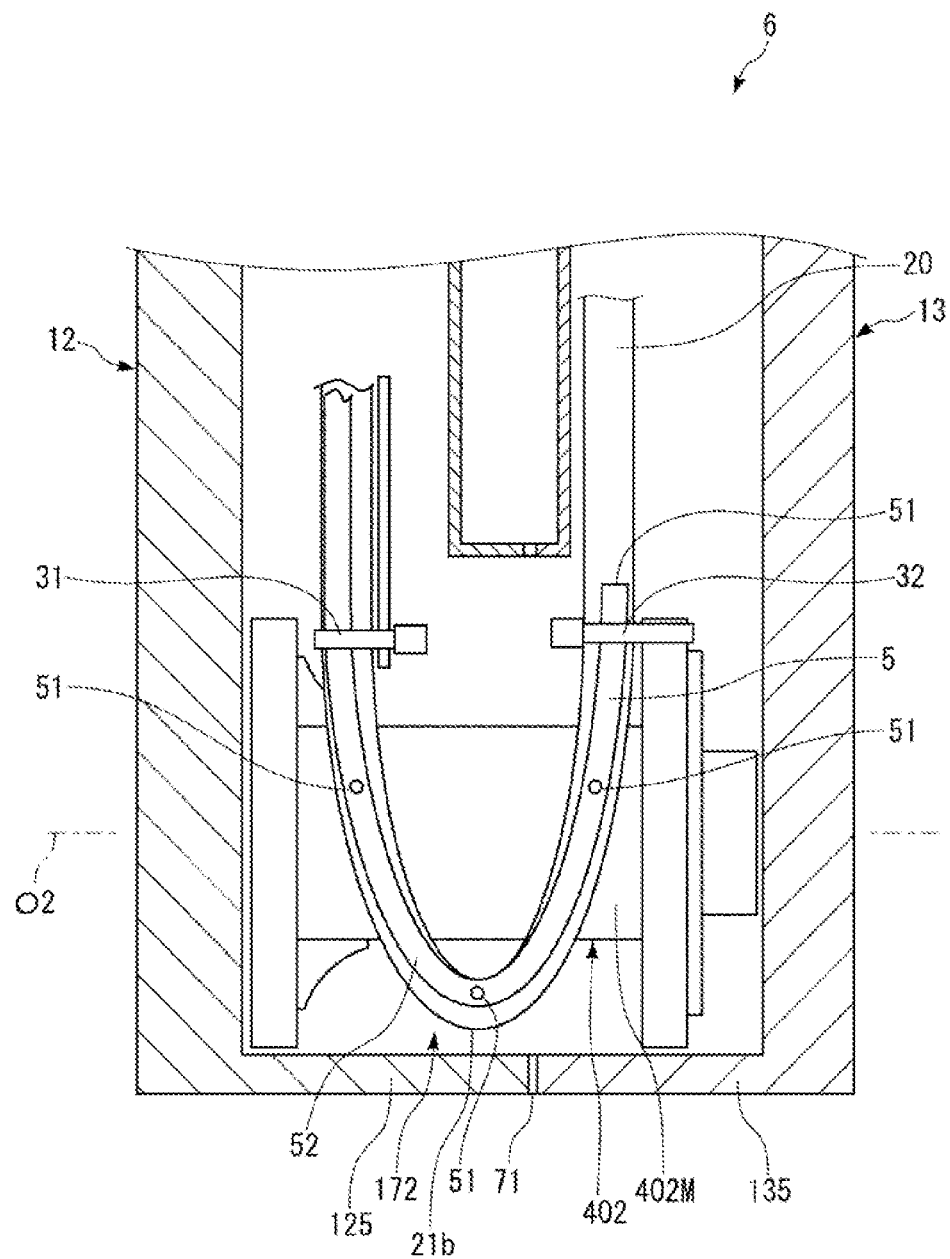
FIG. 13 is a sectional view schematically showing a section of the first arm and the second arm in a fourth embodiment of the robot according to the invention.

FIG. 13 is a sectional view schematically showing a section of the first arm and the second arm in the fourth embodiment of the robot according to the invention.

As below, the fourth embodiment will be explained with a focus on differences from the above described embodiments and the explanation of the same items will be omitted.

As shown in FIG. 13, in the robot 1 of the embodiment, a plurality of suction holes 51 are formed in the side surface of the tube 5. That is, the suction holes 51 are openings provided in the side surface of the tube 5. Thereby, the gas inside of the robot arm 6 may be promptly and appropriately suctioned. Note that the opening of the distal end surface of the tube 5 may be used as a suction hole or closed.

Further, the suction holes 51 are placed closer to the opposite side to the folded-back portion 21b than the first fixing portion 31 and the second fixing portion 32. Specifically, the suction holes 51 are formed in the folded-back portion 52. Thereby, abrasion powder of the cable 20 may be appropriately suctioned. Note that the suction holes 51 may be formed in different positions from the folded-back portion 52.

The number of suction holes 51 is not particularly limited, but appropriately set according to conditions. The number is preferably three or more, and more preferably from three to twenty. Or, the number of suction holes 51 may be one.

Note that, in the embodiment, the configuration in the joint 172 is representatively explained, however, the same configuration may be employed in the other joints.

According to the fourth embodiment, the same advantages as those of the above described embodiments may be offered.

As described above, the suction holes 51 are the openings provided in the side surface of the tube 5. Thereby, the gas inside of the robot arm 6 may be appropriately suctioned.

Further, the plurality of the suction holes 51 are provided. Thereby, the gas inside of the robot arm 6 may be promptly and appropriately suctioned.

The robot arm 6 includes the first fixing portion 31 that fixes the cable 20 to the first arm 12, and the second fixing portion 32 that fixes the cable 20 to the second arm 13. Further, the cable 20 has the folded-back portion 21b as the example of the portion folded back between the first fixing portion 31 and the second fixing portion 32 and slidable. The suction holes are placed closer to the folded-back portion 21b (slidable portion) side than the first fixing portion 31 and the second fixing portion 32. Thereby, abrasion powder of the cable 20 may be appropriately suctioned.

Fifth Embodiment

Figure 14:
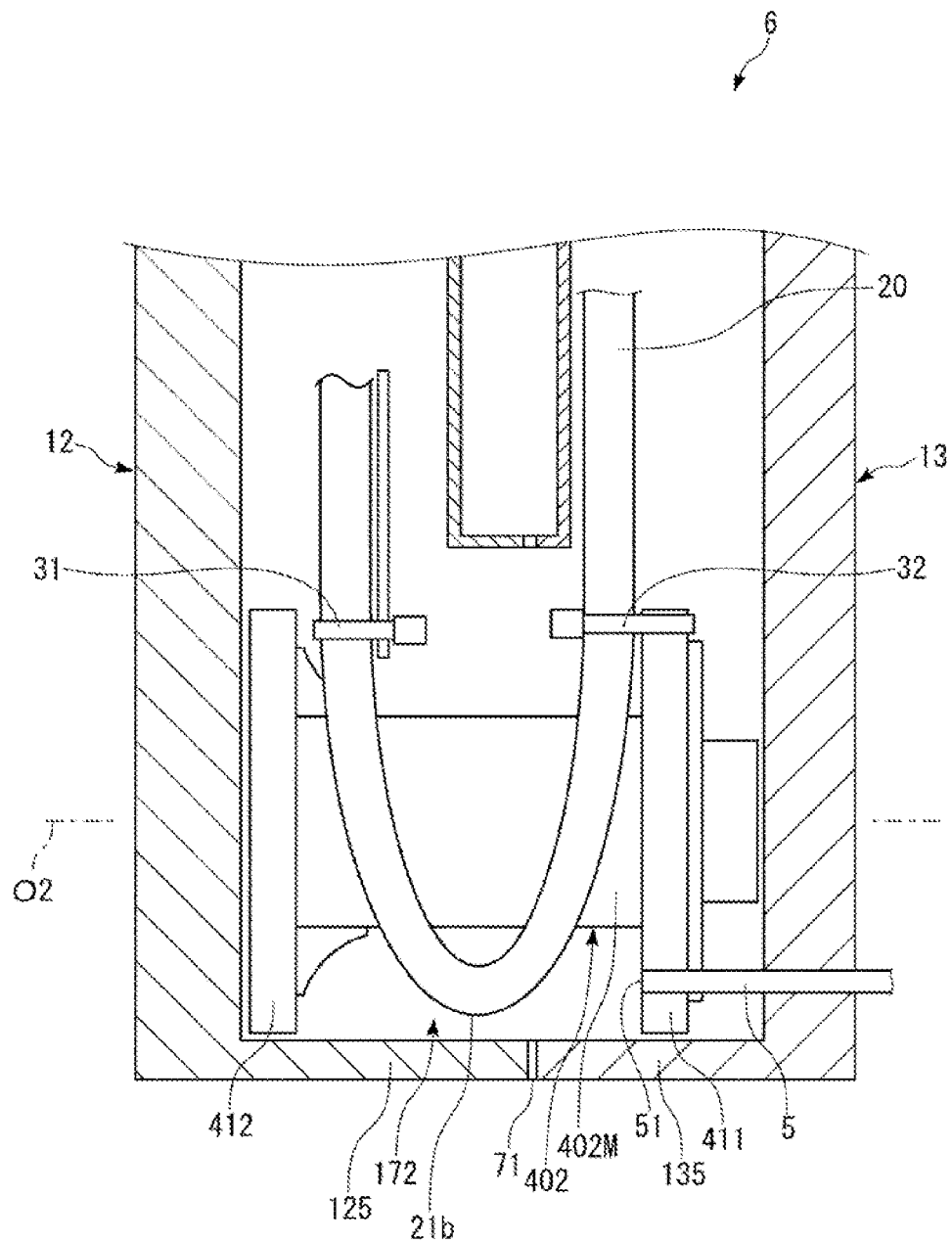
FIG. 14 is a sectional view schematically showing a section of the first arm and the second arm in a fifth embodiment of the robot according to the invention.

FIG. 14 is a sectional view schematically showing a section of the first arm and the second arm in the fifth embodiment of the robot according to the invention.

As below, the fifth embodiment will be explained with a focus on differences from the above described embodiments and the explanation of the same items will be omitted.

As shown in FIG. 14, in the robot 1 of the embodiment, the suction hole 51 of the tube 5 is placed closer to the folded-back portion 21b side than the first fixing portion 31 and the second fixing portion 32. Specifically, the tube 5 penetrates the cover 135 of the second arm 13 and is fixed to the fixing member 411 that fixes the motor 402M. The suction hole 51 is placed inside of the joint 172. Thereby, the abrasion powder of the cable 20 may be appropriately suctioned.

The position to which the tube 5 is fixed is not limited to the above described position, but the tube 5 may be fixed to e.g. another position of the fixing member 411 or may be fixed in any position of the other fixing member 412 that fixes the motor 402M.

Note that, in the embodiment, the configuration in the joint 172 is representatively explained, however, the same configuration may be employed in the other joints.

According to the fifth embodiment, the same advantages as those of the above described embodiments may be offered.

MODIFIED EXAMPLES

Modified Example 1

The suction hole 51 (tube 5) is placed only in the joints, parts required for higher cleanliness or the vicinities thereof.

Modified Example 2

The tube is branched and the pluralities of joints, parts, or the vicinities thereof are suctioned from suction holes of the plurality of branched tubes.

As above, the robot according to the invention is explained according to the illustrated embodiments, however, the invention is not limited to those and the configurations of the respective parts may be replaced by arbitrary configurations having the same functions. Further, other arbitrary configurations may be added thereto.

Furthermore, the invention may include a combination of two or more arbitrary configurations (features) of the above described respective embodiments.

In the above described embodiments, the number of rotation axes of the robot arm is six, however, not limited to that in the invention. The number of rotation axes of the robot arm may be e.g. two, three, four, five, seven, or more. That is, in the above described embodiments, the number of arms (links) is six, however, not limited to that in the invention. The number of arms may be e.g. two, three, four, five, seven, or more. For example, in the robot of the above described embodiments, a robot having seven arms may be realized by addition of an arm between the second arm and the third arm.

Further, in the above described embodiments, the number of robot arms is one, however, not limited to that in the invention. The number of robot arms may be e.g. two or more. That is, the robot (robot main body) may be e.g. a multi-arm robot including a dual-arm robot.

Furthermore, in the above described embodiments, as the end effector, the hand is taken as an example, however, the end effector is not limited to that in the invention. The end effector includes e.g. a drill, welding machine, and laser irradiation apparatus.

In the above described embodiments, the location to which the base of the robot is fixed is the ceiling, however, not limited to that in the invention. In addition, the location includes e.g. a wall, workbench, floor, and the ground in the installation space. Or, the robot may be installed within a cell. In this case, the location to which the base is fixed is not particularly limited, but may include e.g. a ceiling part, wall part, workbench, and floor part of the cell.

In the above described embodiments, the surface to which the robot (base) is fixed is the flat surface (plane) parallel to the horizontal plane, however, not limited to that in the invention. For example, the surface may be a flat surface (plane) inclined relative to the horizontal plane or vertical plane or a flat surface (plane) parallel to the vertical plane. That is, the first rotation axis may be inclined relative to the horizontal direction or vertical direction or parallel to the horizontal direction.

In the invention, the robot may be another type (form) of robot. Specific examples include e.g. a horizontal articulated robot and a legged walking (running) robot having leg parts. "Horizontal articulated robot" refers to a robot having an arm (except a spline shaft) moving in the horizontal directions.

As below, the details derived from the embodiments will be described.

The robot includes a base, a robot arm having a first arm provided on the base rotatably about a first rotation axis and a second arm provided on the first arm rotatably about a second rotation axis, a cable placed inside of the robot arm, and a tube having a suction hole for suctioning a gas inside of the robot arm when connected to a suction device, wherein a first gap is provided between the first arm and the second arm, and the suction hole is placed inside of the robot arm.

According to the robot, the gas inside of the robot arm is suctioned, and thereby, the interior of the robot arm may be set at negative pressure, foreign matter including lubricants and abrasion powder of the cable coming out from inside of the robot arm via the first gap may be suppressed.

In the robot, it is preferable that the suction hole is an opening provided in an end surface of the tube.

Thereby, the gas inside of the robot arm may be appropriately suctioned.

In the robot, it is preferable that the suction hole is an opening provided in a side surface of the tube.

Thereby, the gas inside of the robot arm may be appropriately suctioned.

In the robot, it is preferable that a plurality of the suction holes are provided.

Thereby, the gas inside of the robot arm may be promptly and appropriately suctioned.

In the robot, it is preferable that the tube is placed along the cable.

Thereby, the abrasion powder of the cable may be appropriately suctioned, and another space for placement of the tube is unnecessary and the robot may be downsized.

In the robot, it is preferable that a first fixing portion that fixes the cable to the first arm and a second fixing portion that fixes the cable to the second arm are provided, the cable has a portion folded back between the first fixing portion and the second fixing portion and slidable, and the suction hole is placed closer to a side of the slidable portion than the first fixing portion and the second fixing portion.

Thereby, the abrasion powder of the cable may be appropriately suctioned.

In the robot, it is preferable that a first fixing portion that fixes the cable to the first arm and a second fixing portion that fixes the cable to the second arm are provided, the cable has a portion folded back between the first fixing portion and the second fixing portion and slidable, and the suction hole is placed closer to an opposite side to the slidable portion than the first fixing portion and the second fixing portion.

Thereby, the gas inside of the robot arm may be appropriately suctioned.

In the robot, it is preferable that the robot arm has a third arm provided on the second arm rotatably about a third rotation axis and a second gap between the second arm and the third arm, and the suction hole is placed between the first gap and the second gap as seen from an axial direction of the second rotation axis.

Thereby, foreign matter coming out from the first gap and the second gap may be suppressed.

The entire disclosures of Japanese Patent Application No. 2018-036006, filed Feb. 28, 2018, and No. 2018-084832, filed Apr. 26, 2018 are expressly incorporated by reference herein.

What is claimed is:

1. A robot comprising:
   a base;
   a robot arm having a first arm provided on the base and configured to rotate about a first rotation axis and a second arm provided on the first arm and configured to rotate about a second rotation axis, the first arm having a first housing defining a first internal space, and the second arm having a second housing defining a second internal space separated from the first internal space;
   a cable disposed within the first housing of the first arm and the second housing of the second arm of the robot arm; and
   a tube having a suction hole for suctioning a gas inside of the robot arm when connected to a suction device, the tube being disposed within the first housing of the first arm,
   wherein a first gap is provided between the first arm and the second arm, and the suction hole is placed inside of the robot arm,
   wherein a first clamping band that fixes the cable to the first arm and a second clamping band that fixes the cable to the second arm are provided,
   wherein the cable has an area folded back between the first clamping band and the second clamping band and slidable, and
   wherein the suction hole is placed closer to a side of the area than the first clamping band and the second clamping band.

2. The robot according to claim 1, wherein the suction hole is an opening provided in an end surface of the tube.

3. The robot according to claim 1, wherein the suction hole is an opening provided in a side surface of the tube.

4. The robot according to claim 3, wherein a plurality of the suction holes are provided.

5. The robot according to claim 1, wherein the tube is placed along the cable.

6. The robot according to claim 1, wherein the robot arm has a third arm provided on the second arm configured to rotate about a third rotation axis and a second gap between the second arm and the third arm, and the suction hole is placed between the first gap and the second gap as seen from an axial direction of the second rotation axis.

7. A robot comprising:
   a base;
   a robot arm having a first arm provided on the base and configured to rotate about a first rotation axis and a second arm provided on the first arm and configured to rotate about a second rotation axis, the first arm having a first housing defining a first internal space, and the second arm having a second housing defining a second internal space separated from the first internal space;
   a cable disposed within the first housing of the first arm and the second housing of the second arm of the robot arm; and
   a tube having a suction hole for suctioning a gas inside of the robot arm when connected to a suction device, the tube being disposed within the first housing of the first arm,
   wherein a first gap is provided between the first arm and the second arm, and the suction hole is placed inside of the robot arm,
   wherein the robot arm has a third arm provided on the second arm configured to rotate about a third rotation axis and a second gap between the second arm and the third arm, and
   wherein the suction hole is placed between the first gap and the second gap as seen from an axial direction of the second rotation axis.

8. The robot according to claim 7, wherein the suction hole is an opening provided in an end surface of the tube.

9. The robot according to claim 7, wherein the suction hole is an opening provided in a side surface of the tube.

10. The robot according to claim 9, wherein a plurality of the suction holes are provided.

11. The robot according to claim 7, wherein the tube is placed along the cable.

12. A robot comprising:
    a base;
    a robot arm having a first arm provided on the base and configured to rotate about a first rotation axis and a second arm provided on the first arm and configured to rotate about a second rotation axis, the first arm having a first housing defining a first internal space, and the second arm having a second housing defining a second internal space separated from the first internal space;
    a cable disposed within the first housing of the first arm and the second housing of the second arm of the robot arm; and
    a tube having a suction hole for suctioning a gas inside of the robot arm when connected to a suction device, the tube being disposed within the first housing of the first arm,
    wherein a first gap is provided between the first arm and the second arm, and the suction hole is placed inside of the robot arm,
    wherein a first clamping band that fixes the cable to the first arm and a second clamping band that fixes the cable to the second arm are provided,
    wherein the cable has an area folded back between the first clamping band and the second clamping band and slidable, and
    wherein the suction hole is placed closer to an opposite side to the area than the first clamping band and the second clamping band.

* * * * *